United States Patent
Mukhtar et al.

(10) Patent No.: US 11,934,812 B2
(45) Date of Patent: Mar. 19, 2024

(54) ON-TARGET UNIT TESTING

(71) Applicant: Rivian IP Holdings, LLC, Irvine, CA (US)

(72) Inventors: Shayan Mukhtar, Mississauga (CA); Richard Stephen Chelminski, Oakland, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/567,047

(22) Filed: Dec. 31, 2021

(65) Prior Publication Data
US 2023/0071041 A1 Mar. 9, 2023

Related U.S. Application Data

(60) Provisional application No. 63/240,190, filed on Sep. 2, 2021.

(51) Int. Cl.
*G06F 9/44* (2018.01)
*G06F 8/41* (2018.01)

(52) U.S. Cl.
CPC .............. *G06F 8/4434* (2013.01); *G06F 8/43* (2013.01)

(58) Field of Classification Search
CPC ................................. G06F 8/43; G06F 8/4434
USPC .................................................. 717/140–161
See application file for complete search history.

(56) References Cited

U.S. PATENT DOCUMENTS

| 5,835,699 A * | 11/1998 | Kimura | G06F 11/362 |
| | | | 714/E11.21 |
| 7,954,059 B2 * | 5/2011 | Macklem | G06F 8/34 |
| | | | 717/113 |
| 11,074,305 B1 * | 7/2021 | Ruiz | G06F 16/2448 |
| 11,398,117 B1 * | 7/2022 | Slindee | G07C 5/008 |

OTHER PUBLICATIONS

University of Amsterdam, "SCIL_Image", 1998, Version 1.4, User Manual, Netherlands, 242 pages. (Year: 1998).*

* cited by examiner

*Primary Examiner* — Ted T. Vo
(74) *Attorney, Agent, or Firm* — Haley Guiliano LLP

(57) ABSTRACT

The present disclosure is directed to systems and methods directed to improving the functions of a vehicle. Systems and methods are provided that provide a custom tool that autogenerates a set of software agents that allows a system to separate processing, transmission and receiving of messages to achieve better synchronization. The disclosure herein also provides a simplified method of key provisioning by designating one client as a server and assigning a symmetric key to every other client permanently provisioned between that client and the server. Systems and method are further provided that predict faults in a vehicle. Systems and methods are also provided that preserve data in the event of a system crash. Systems and methods are also provided in which an operating system of a vehicle detects the presence of a new peripheral and pulls the related interface file for that new peripheral. Further, a data synchronization solution is provided herein which provides optimized levels of synchronization.

20 Claims, 29 Drawing Sheets

ON-TARGET UNIT TESTING

CROSS REFERENCE TO RELATED APPLICATION

This disclosure claims the benefit of U.S. Provisional Application No. 63/240,190 filed on Sep. 2, 2021, which is herein incorporated by reference in its entirety.

SUMMARY

The present disclosure is directed to systems and methods directed to improving the functions of a vehicle.

A typical vehicle includes systems that perform functions requiring synchronization. In many of these systems some tasks take priority and are allowed to preempt others, pausing a first task in favor of another. Some typical vehicle systems also run end-to-end checking and unpacking of data. In these tasks, signal data and end-to-end result data must be synchronized to ensure that the end-to-end result corresponds to the correct data. However, if a second task preempts an end-to-end check, the data will not correspond properly. The mismatch in data may cause an issue which may require additional cycles to fix or may even lead to system crash. Consequently, what is needed is a system for ensuring synchronization between tasks. In accordance with the present disclosure, systems and methods are provided that provide a custom tool that autogenerates a set of software agents that allows a system to separate processing, transmission and receiving of messages to achieve better synchronization. In some embodiments a preselected text-based descriptor file format (e.g., specially formatted DBC files) is used to describe the network of the vehicle through multiple file fragments per bus. The descriptor file format may require a certain style of comments or stubbed out portions that provide the needed information but would not be executed. In another implementation, a descriptor file format may require data to be provided in a certain order and with certain marks (e.g., with pre-defined variable names). In some embodiments, the code auto-generation software is aware of the file format and may add signals that will compile without issue or additional processing.

Some embodiments include a method comprising accessing a file that comprises information for decoding bus data, generating, based on the file, a plurality of software agents, wherein the software agents, when executed, are configured to receive a raw message via the bus, the raw message to generate a signal value, generate a security protection value for the raw message, and in response to a request for the signal value from an instance of an application executing based on instructions in a protected memory location, provide synchronous access to the signal value and the security protection value. In some embodiments generating the plurality of software agents comprises a first set of instructions for execution from a first unsecure memory partition, wherein the first set of instructions, when executed, is configured to receive a raw message from the bus, generating a second set of instructions for execution from a protected memory partition wherein the second set of instructions, when executed, is configured to unpack the raw message to generate the signal value, perform verification to generate the security protection value for the raw message, store the signal value and the security protection value, and synchronously transmit the signal value and the security protection value to the instance of an application, a third set of instructions for execution from a second unsecure memory partition wherein the third set of instructions, when executed, is configured to unpack the raw message to generate a signal value, transmit the signal value to the instance of an application. In some embodiments the bus is a Controller Area Network (CAN) bus. In some embodiments the file is a database (DBC) file that comprises instructions for decoding CAN bus data from at least on sensor. In some embodiments the first unsecure memory partition is a Quality Management (QM) partition. In some embodiments the protected memory partition is an Automotive Safety Integrity Level (ASIL) partition. In some embodiments generating the security protection value comprises generating an End-to-End (E2E) status.

Some embodiments include a non-transitory computer readable medium having instructions encoded thereon, that when executed by control circuitry causes the control circuitry to access a file that comprises information for decoding bus data generate, based on the file, a plurality of software agents, wherein the software agents, when executed, are configured to receive a raw message via the bus, unpack the raw message to generate a signal value, a security protection value for the raw message, and response to a request for the signal value from an instance of an application executing based on instructions in a protected memory location, provide synchronous access to the signal value and the security protection value. In some embodiments, the control circuitry causes generation of the plurality of software agents by generating a first set of instructions for execution from a first unsecure memory partition, wherein the first set of instructions, when executed, is configured to receive a raw message from the bus, generating a second set of instructions for execution from a protected memory partition wherein the second set of instructions, when executed, is configured to unpack the raw message to generate the signal value, perform verification to generate the security protection value for the raw message, store the signal value and the security protection value, and synchronously transmit the signal value and the security protection value to the instance of an application, generating a third set of instructions for execution from a second unsecure memory partition wherein the third set of instructions, when executed, is configured to unpack the raw message to generate a signal value, transmit the signal value to the instance of an application. In some embodiments the bus is a Controller Area Network (CAN) bus. In some embodiments the file is a database (DBC) file that comprises instructions for decoding CAN bus data from at least on sensor. In some embodiments the first unsecure memory partition is a Quality Management (QM) partition. In some embodiments the protected memory partition is an Automotive Safety Integrity Level (ASIL) partition. In some embodiments generating the security protection value comprises generating an End-to-End (E2E) status.

Some embodiments include a vehicle system comprising a sensor connected to at least one bus, and control circuitry configured to access a file that comprises information for decoding bus data received from the sensor via the bus, and generate, based on the file, a plurality of software agents, wherein the software agents, when executed, are configured to receive a raw message via the bus, unpack the raw message to generate a signal value, generate a security protection value for the raw message, and in response to a request for the signal value from an instance of an application executing based on instructions in a protected memory location, provide synchronous access to the signal value and the security protection value. In some embodiments the control circuitry is configured to generate the plurality of software agents by generating a first set of instructions for execution from a first unsecure memory partition, wherein the first set of instructions, when executed, is configured to receive a raw message from the bus, generating a second set of instructions for execution from a protected memory partition wherein the second set of instructions, when executed, is configured to unpack the raw message to generate the signal value, perform verification to generate the security protection value for the raw message, store the signal value and the security protection value, and synchronously transmit the signal value and the security protection value to the instance of an application, generating a third set of instructions for execution from a second unsecure memory partition wherein the third set of instructions, when executed, is configured to unpack the raw message to generate a signal value, transmit the signal value to the instance of an application. In some embodiments the bus is a Controller Area Network (CAN) bus. In some embodiments the file is database (DBC) file that comprises instructions for decoding CAN bus data from at least one sensor. In some embodiments the first unsecure memory partition is a Quality Management (QM) partition. In some embodiments the protected memory partition is an Automotive Safety Integrity Level (ASIL) partition.

Typical vehicle systems include hardware or software modules that may need to exchange cryptographic key or keys (e.g., an ephemeral keys) to encrypt messages sent between each other. Existing systems are burdensome, requiring many keys and certificates for each module to have a private or public key for each secure transaction. An improved, simplified method of key provisioning is needed. The disclosure herein provides such a method by designating one client as a server and assigning a symmetric key to every other client permanently provisioned between that client and the server. This symmetric key minimizes the need for a permanent key and can be used to leverage ephemeral keys. During an exchange, in some embodiments, one client may initiate communication with a second client. In some embodiments, the second client may then request an ephemeral key from the server, which was created for this transaction. The server also may verify that the first client indeed requested communication. The server may respond to client 2 with the ephemeral key. In some embodiments, clients 1 and 2 are now in possession of a shared key and may securely communicate. This method reduces the number of keys required and simplifies secure communication.

Some embodiments include a method for establishing secure communications between a first node and a second node within a vehicle, the method comprising the steps of receiving, from the first node of the vehicle, a first message comprising information identifying the second node of the vehicle, in response to receiving the first message, generating, using the vehicle's processing circuitry, an encryption key, communicating to the first node of the vehicle information identifying the encryption key, receiving, from the second node of the vehicle, a second message comprising information identifying the first node of the vehicle, determining, using the processing circuitry, the second message is valid based on the first message, and communicating to the second node of the vehicle information identifying the encryption key. In some embodiments the first message further comprises a random number generated by the first node of the vehicle. Some embodiments include communicating a hash of the random number to the first node of the vehicle. In some embodiments the second message further comprises a random number generated by the second node. Some embodiments include communicating a hash of the random number to the first node of the vehicle. In some embodiments, the first node of the vehicle and the second node of the vehicle are on a shared bus in the vehicle. In some embodiments communicating to the first node of the vehicle and the communicating to the second node of the vehicle are done over the shared bus.

Some embodiments include a system for establishing secure communications between a first node and a second node within a vehicle, the system comprising a first message from the first node of the vehicle comprising information identifying the second node of the vehicle a second message from the second node of the vehicle comprising information identifying the first node of the vehicle wherein said second message is determined to be valid based on the first message, and an encryption key wherein the encryption key is identified to the first node and the second node. In some embodiments, the first message further comprises a random number generated by the first node of the vehicle. Some embodiments include a hash of the random number wherein the hash is communicated to the first node of the vehicle. In some embodiments the second message further comprises a random number generated by the second node. Some embodiments include a hash of the random number wherein hash is communicated to the first node of the vehicle. In some embodiments the first node of the vehicle and the second node of the vehicle are on a shared bus in the vehicle. In some embodiments the encryption key is identified to the first node and the second node by communication over the shared bus.

Some embodiments include a non-transitory computer-readable medium having non-transitory computer-readable instructions encoded thereon that, when executed by a processor, causes the processor to receive, from the first node of the vehicle, a first message comprising information identifying the second node of the vehicle, in response to receiving the first message, generate, using the vehicle's processing circuitry, an encryption key, communicate to the first node of the vehicle information identifying the encryption key, receive, from the second node of the vehicle, a second message comprising information identifying the first node of the vehicle determine, using the processing circuitry, the second message is valid based on the first message, and communicate to the second node of the vehicle information identifying the encryption key. In some embodiments the first message further comprises a random number generated by the first node of the vehicle. Some embodiments include communicating a hash of the random number to the first node of the vehicle. In some embodiments the second message further comprises a random number generated by the second node. In some embodiments the first node of the vehicle and the second node of the vehicle are on a shared bus in the vehicle. In some embodiments the communicating to the first node of the vehicle and the communicating to the second node of the vehicle are done over the shared bus.

Over the course of a vehicle's life, it will encounter malfunctions. Not only can malfunctions in a vehicle cause inconveniences such as impacting the vehicle's performance, they can be dangerous as they may compromise the safety of the vehicle. They further may lead to other malfunctions with additional problems. Given these complications, it is advantageous to detect malfunctions as quickly as possible so that they may be addressed before creating dangerous or expensive complications. In particular a system is needed that predicts faults before they occur. In accordance with the present disclosure, systems and method are provided that predict faults in a vehicle. In some embodiments, the system includes a fleet of vehicles all of which are connected to a server. The server may receive data from multiple vehicles in the fleet regarding the vehicle's metrics and conditions. The server further may analyze the received metrics and determine how often a particular issue occurs. The server may store this information and continue to monitor vehicles. Another vehicle may report metrics similar to or with a shown correlation to a particular issue and the server may provide early failure detection to that vehicle. In some embodiments the server may transmit an early warning to the vehicle urging repair or other action. In this way the disclosure provides a means of predicting a malfunction and mitigating the harm it may cause.

Some embodiments include a method for predicting a fault event in a vehicle, the method comprising monitoring, using processing circuitry, a plurality of operating parameters of a vehicle and a geographical location of the vehicle determining, using the processing circuitry, that values of the operating parameters and geographical location likely correlate to a fault event based on a model trained using respective values of the operating parameters for a set of vehicles and respective geographical locations of the set of vehicles experiencing respective fault events, and causing, using the processing circuitry, an action to be performed in response to the determining. Some embodiments also include transmitting to a remote server the operating parameters and the geographical location of the vehicle, wherein determining that the values of the operating parameters and the geographical location likely correlate to the fault event comprises receiving from the remove server information indicative of the correlation. In some embodiments the model is located at the remote server. In some embodiments causing the action to be performed comprises causing a notification to be provided indicative of the fault event. In some embodiments causing the action to be performed comprises causing a change to at least one of the plurality of operating parameters to avoid the fault event from occurring. In some embodiments causing the action to be performed comprises causing at a remote server the action to be performed, wherein the action is performed within the vehicle. In some embodiments the model is repeatedly updated based on new data provided by the set of vehicles.

Some embodiments include a system for predicting a fault event in a vehicle, the system comprising a plurality of operating parameters of a vehicle, a geographical location of the vehicle, values of the operating parameters and the geographical location likely correlate to a fault event based on a model trained using respective values of the operating parameters for a set of vehicles and respective geographical locations of the set of vehicles experiencing respective fault events wherein values of the operating parameters and geographical location are determined to likely correlate to a fault event based on the model and an action performed in response to the determination. Some embodiments include providing information indicative of the correlation of the operating parameters and the geographical location of the vehicle to the fault event. In some embodiments the model is located at the remote server. Some embodiments include a notification indicative of the fault event. In some embodiments the action comprises a change to at least one of the plurality of operating parameters to avoid the fault event from occurring. In some embodiments the action is performed by a remote server and wherein the action is performed within the vehicle. In some embodiments the model is repeatedly updated based on new data provided by the set of vehicles.

Some embodiments include a non-transitory computer-readable medium having non-transitory computer-readable instructions encoded thereon that, when executed by a processor, causes the processor to monitor, using processing circuitry, a plurality of operating parameters of a vehicle and a geographical location of the vehicle, determine, using the processing circuitry, that values of the operating parameters and geographical location likely correlate to a fault event based on a model trained using respective values of the operating parameters for a set of vehicles and respective geographical locations of the set of vehicles experiencing respective fault events, and cause, using the processing circuitry, an action to be performed in response to the determining. Some embodiments include transmitting to a remote server the operating parameters and the geographical location of the vehicle, wherein determining that the values of the operating parameters and the geographical location likely correlate to the fault event comprises receiving from the remove server information indicative of the correlation. In some embodiments the model is located at the remote server. In some embodiments to cause the action to be performed comprises causing a notification to be provided indicative of the fault event. In some embodiments to cause the action to be performed comprises causing a change to at least one of the plurality of operating parameters to avoid the fault event from occurring. In some embodiments to cause the action to be performed comprises causing at a remote server the action to be performed, wherein the action is performed within the vehicle. In some embodiments the model is repeatedly updated based on new data provided by the set of vehicles.

System crashes are a common problem in vehicle systems. Systems may for example become unresponsive. In these situations, the system is at risk of losing data as some information may be irretrievable or unrecoverable. Loss of data may prevent functions from operating properly or from properly recording information, both of which may cause various problems. Therefore, a system for preserving data is needed. In accordance with the present disclosure, systems and methods are provided that preserve data in the event of a system crash. In some embodiments the system includes stand by memory. In some embodiments the system may take one or more snapshots of system information and save it in the stand by memory. In some embodiments, the memory will not be cleared between boots. In this way, the disclosed system provides a means of preserving data in the event of a crash.

Some embodiments include a method for storing information about a vehicle, the method comprising detecting, by processing circuitry, a fault event and in response to the detecting generating, by the processing circuitry, the information about the vehicle at a time of the fault event, generating, by the processing circuitry, integrity data based on the information, causing to be stored, by the processing circuitry, the information about the vehicle and the integrity data in a portion of volatile memory, wherein the portion of the volatile memory is configured to retain stored data during a reboot of an operating system of the vehicle, causing, using the processing circuitry, the operating system of the vehicle to be rebooted, after rebooting, validating, using the processing circuitry, the information stored in the volatile memory based on the integrity data, and in response to the validating, causing the information about the vehicle to be stored in non-volatile memory. In some embodiments the integrity data comprises a cyclic redundancy check (CRC). In some embodiments the volatile memory comprises random access memory (RAM). In some embodiments the portion of volatile memory is a dedicated portion of the volatile memory reserved for the information and the integrity data. In some embodiments detecting the fault event comprises detecting a system crash. In some embodiments the information comprises a snapshot of a state of software in the vehicle. In some embodiments generating the information, generating the integrity data, and causing the information and the integrity data to be stored is performed by an emergency stack that is programmed to be executed in the event of the fault event. Some embodiments include a system for storing information about a vehicle, the system comprising an operating system of a vehicle, a fault event, information about the vehicle at a time of the fault event, integrity data generated based on the information about the vehicle at a time of the fault event, a portion of volatile memory configured to retain stored data during a reboot of the operating system of the vehicle, wherein the information about the vehicle and the integrity data are stored in the portion of volatile memory in response to the fault event, non-volatile memory wherein in response to the operating system of the vehicle being rebooted, the information about the vehicle is validated based on the integrity data and wherein, in response to the validation, the information about the vehicle is stored in the non-volatile memory. In some embodiments the integrity data comprises a cyclic redundancy check (CRC). In some embodiments the volatile memory comprises random access memory (RAM). In some embodiments the portion of volatile memory is a dedicated portion of the volatile memory reserved for the information and the integrity data. In some embodiments detecting the fault event comprises detecting a system crash. In some embodiments the information comprises a snapshot of a state of software in the vehicle. Some embodiments include an emergency stack that is programmed to generate the information, generate the integrity data, and cause the information and the integrity data to be stored in the event of the fault event.

Some embodiments include a non-transitory computer-readable medium having non-transitory computer-readable instructions encoded thereon that, when executed by a processor, causes the processor to detect, by processing circuitry, a fault event, and in response to the detecting generate, by the processing circuitry, the information about the vehicle at a time of the fault event, generate, by the processing circuitry, integrity data based on the information, cause to be stored, by the processing circuitry, the information about the vehicle and the integrity data in a portion of volatile memory, wherein the portion of the volatile memory is configured to retain stored data during a reboot of an operating system of the vehicle, cause, using the processing circuitry, the operating system of the vehicle to be rebooted, after rebooting, validate, using the processing circuitry, the information stored in the volatile memory based on the integrity data, and in response to the validating, cause the information about the vehicle to be stored in non-volatile memory. In some embodiments the integrity data comprises a cyclic redundancy check (CRC). In some embodiments the volatile memory comprises random access memory (RAM). In some embodiments the portion of volatile memory is a dedicated portion of the volatile memory reserved for the information and the integrity data. In some embodiments to detect the fault event comprises detecting a system crash. In some embodiments the information comprises a snapshot of a state of software in the vehicle.

A typical vehicle includes peripheral parts, such as a pump break. Peripheral parts are available from many manufacturers in many models. Often, interface files are dedicated to handling a specific file from a specific peripheral. If the peripheral hardware changes, the existing interface files cannot communicate with the new peripheral and entirely new interface hardware is required. This is burdensome and can create delays in the system. However, many peripherals, regardless of hardware share common components. Therefore, it is advantageous to provide a system which is consistent regardless of peripheral hardware. In particular a system is needed that uses the same application code among different hardware. In accordance with the present disclosure, a system is provided in which an operating system of a vehicle detects the presence of a new peripheral and pulls the related interface file for that new peripheral. In some embodiments the system provides an abstraction layer between the peripheral file and the applications receiving peripheral data. In some embodiments, all software related to the peripheral may be able to rely, directly or indirectly, on the abstraction layer, which may translate data from any peripheral with a common function. Accordingly, the peripheral may now be changed without the need to replace existing software.

Some embodiments include a method for updating a vehicle when a new hardware component is installed, the method comprising detecting, using processing circuitry in the vehicle, the new hardware component, identifying, using the processing circuitry, an association between data generated by the new hardware component and at least one software component of the vehicle, and generating, using the processing circuitry, an updated interface for interpreting the data from the hardware component, wherein the updated interface converts the data provided by the hardware component into abstracted information, and wherein the updated interface provides the abstracted information to the at least one software component of the vehicle. In some embodiments the data generated by the new hardware component comprises a database (DBC) file. Some embodiments include storing the updated interface in a library of interfaces, wherein generating the updated interface comprises accessing the updated interface from the library. In some embodiments the updated interface is selected from the library based on an identification of the new hardware component. Some embodiments include processing, by the at least one software component of the vehicle, the abstracted information without regard to the data generated by the new hardware component. In some embodiments the updated interface is used for bidirectional communication between the at least one software component and the new hardware component. In some embodiments generating the updated interface comprises modifying an existing interface.

Some embodiments include a system for updating a vehicle when a new hardware component is installed, the system comprising the new hardware component, an association between data generated by the new hardware component and at least one software component of the vehicle, and an interface configured to convert the data from the hardware component into abstracted information, wherein the interface provides the abstracted information to the at least one software component of the vehicle. In some embodiments the data generated by the new hardware component comprises a database (DBC) file. Some embodiments include a library of interfaces wherein the updated interface is stored. Some embodiments include an identification of the new hardware component wherein the updated interface is selected from the library based the identification of the new hardware component. In some embodiments the abstracted information is processed by the at least one software component of the vehicle without regard to the data generated by the new hardware component. In some embodiments the updated interface is used for bidirectional communication between the at least one software component and the new hardware component. In some embodiments the updated interface is a modification of an existing interface.

Some embodiments include a non-transitory computer-readable medium having non-transitory computer-readable instructions encoded thereon that, when executed by a processor, causes the processor to detect, using processing circuitry in the vehicle, the new hardware component identify, using the processing circuitry, an association between data generated by the new hardware component and at least one software component of the vehicle and generate, using the processing circuitry, an updated interface for interpreting the data from the hardware component, wherein the updated interface converts the data provided by the hardware component into abstracted information, and wherein the updated interface provides the abstracted information to the at least one software component of the vehicle. In some embodiments the data generated by the new hardware component comprises a database (DBC) file. Some embodiments include to cause the processor to store the updated interface in a library of interfaces, wherein to generate the updated interface comprises accessing the updated interface from the library. In some embodiments the updated interface is selected from the library based on an identification of the new hardware component. Some embodiments include causing the processor to process, by the at least one software component of the vehicle, the abstracted information without regard to the data generated by the new hardware component. In some embodiments the updated interface is used for bidirectional communication between the at least one software component and the new hardware component.

A key component of vehicle management systems includes regular data transfers. At times, multiple nodes on the same bus must have the ability to transfer data. Further it is imperative for vehicle function that some of these transfers are synchronized. While some nodes may function with basic, or loose, synchronization, others require very precise synchronization. However, precise synchronization relies on many messages back and forth between the client and the server and precisely synchronizing every node may overwhelm the system, saturating the bus and degrading performance. A hybrid solution which can accommodate both loose and tight synchronization is needed. As described in the present disclosure, a hybrid solution is provided herein which provides the advantage of offering tight synchronization when needed and loose synchronization when tight synchronization is not needed. As disclosed, the server of the system may continuously transit its internal time. A receiving node may then compare the time it has received a message from the server to the server's internal time and compute the difference. The node may then adjust its internal time to match that of the server, to achieve loose synchronization. For tight synchronization, a node may request a precise synchronization and may include its own timestamp in the request. The server may respond with the time the request was received, which reflects any delay between the server and the client, and the time of its response. The node may compute the delay between the server receipt and the server transmission, and the delay between node transmission and the node receipt and subtract these values. The node may also compute the clock offset by creating an average of the time difference between the node clock and server clock. The offset values may be used by the node to modify its local clock to tightly match the server clock (e.g., by adding the roundtrip delay and clock offset to its internal clock).

Additionally, in some implementations a node may store a history of computed clock offsets and roundtrip delays. If the history indicates a stable pattern, the node may reduce the frequency at which it requests tight synchronization or stops sending request for tight synchronization and rely on historical values instead to perform synchronization. Advantageously, if two nodes are synched to each other they can perform a tight server synch using the same message from the server since their transmittal values will be the same.

Some embodiments include a system for tight synchronization between a first client, a second client, and a time server, each associated with a respective local clock, the system comprising the time server connected to a bus, the first client connected to the bus, the second client connected to the bus, wherein the first client is configured to request tight synchronization with the time server by transmitting over the bus a synchronization message, wherein the time server is configured to generate a periodic synchronization message communicated over the bus, the time server client is configured to adjust the periodic synchronization message based on the tight synchronization request from the first client by adjusting the next periodic synchronization message to include: (a) a first time indicative of when the first client transmitted the synchronization message, (b) a second time indicative of when the server received the tight synchronization request, and (c) a third time indicative of when the periodic synchronization message was sent by the time server, the first client is configured to perform tight synchronization based on the adjusted periodic synchronization message, and the second client is configured to perform loose synchronization based on the adjusted periodic synchronization message. In some embodiments, the first client is further configured to perform the tight synchronization based on content of the adjusted periodic synchronization message and on a time of receipt of the adjusted periodic synchronization message. In some embodiments the synchronization message comprises data indicative of the first time. Some embodiments include memory for storing information about delays between the time server and the first client. Some embodiments include circuitry that determines a pattern based on the delays and causes synchronization between the first client and the time server to occur based on the pattern.

Some embodiments include a method for tight synchronization between a first client, a second client, and a time server, each associated with a respective local clock and each connected to a bus, the method comprising generating by the time server a periodic synchronization message to be communicated over the bus, receiving at the time server over the bus a synchronization message comprising a request for tight synchronization from the first client, in response to receiving the synchronization message, adjusting by the time server the periodic synchronization message based on the tight synchronization request by adjusting the next periodic synchronization message to include: (a) a first time indicative of when the first client transmitted the synchronization message, (b) a second time indicative of when the server received the tight synchronization request, and (c) a third time indicative of when the periodic synchronization message was sent by the time server, performing by the first client tight synchronization based on the adjusted periodic synchronization message, and performing by the second client loose synchronization based on the adjusted periodic synchronization message. Some embodiments include performing the tight synchronization based on content of the adjusted periodic synchronization message and on a time of receipt of the adjusted periodic synchronization message. In some embodiments the first client, the second client, and the time server are located on a vehicle. In some embodiments the synchronization message comprises data indicative of the first time. Some embodiments include storing information about delays between the time server and the first client in a memory. Some embodiments include determining by a processing circuitry a pattern based on the delays and causes synchronization between the first client and the time server to occur based on the pattern.

Some embodiments include a non-transitory computer-readable medium having non transitory computer-readable instructions encoded thereon that, when executed by a processor, causes the processor to generate by the time server a periodic synchronization message to be communicated over the bus, receive at the time server over the bus a synchronization message comprising a request for tight synchronization from the first client, in response to receiving the synchronization message, adjust by the time server the periodic synchronization message based on the tight synchronization request by adjusting the next periodic synchronization message to include: (a) a first time indicative of when the first client transmitted the synchronization message, (b) a second time indicative of when the server received the tight synchronization request, and (c) a third time indicative of when the periodic synchronization message was sent by the time server, perform by the first client tight synchronization based on the adjusted periodic synchronization message, and perform by the second client loose synchronization based on the adjusted periodic synchronization message. Some embodiments include causing the processor to perform the tight synchronization based on content of the adjusted periodic synchronization message and on a time of receipt of the adjusted periodic synchronization message. In some embodiments the first client, the second client, and the time server are located on a vehicle. In some embodiments the synchronization message comprises data indicative of the first time. Some embodiments include causing the processor to store information about delays between the time server and the first client in a memory. Some embodiments further include causing the processor to determine a pattern based on the delays and causes synchronization between the first client and the time server to occur based on the pattern.

Unit testing is an integral part of any software system including those operating vehicle components. In a typical vehicle system, a software function may use input received from a second function. To ensure results, it is advantageous to test the first function with every possible input from the second using a mock version of the second function which provides these values. However, many functions are written in a programming language in which providing mock versions of a function requires a separate function. A separate function then requires tedious replacement in the testing setting. A solution is needed which integrates a mock function into the main function for functions which are written in languages where a mock function is separate. According to the disclosure herein, a solution is provided that compiles all functions separately into assembly code stitched together into one super image. During the stitching adjustments to each sub-image are made to accommodate for the fact that they are now located at a different address space. Images to be compiled are fed into a mega-image creation program (MICP). The MICP, for each image, locates the position of that image in memory such that it does not conflict with memory requirements of other images. Then the MICP, for every image, adjusts the machine instructions within to reflect the new final address location. Next the MICP, as part of the final mega-image creation, creates a table of entry points into each sub-image within the mega image that is the combination of all the sub-images, as well as the unit test framework. A single file may then be flashed on a drive that can be used for both testing and production. In this way, mock functions are provided in a function for testing regardless of the programming language used.

Some embodiments may include a method for overloading a function, the method comprising compiling a first image of a first version of the function, compiling a second image of a second version of the function, and generating a stitched super-image by placing code defining the first version of the function and code defining the second version of the function into a memory partition, wherein the code defining the second version of the function is adjusted to not conflict with the code of the first version of the function, and generating a table that is used to selectively call either one of the first version of the function and the second version of the function. In some embodiments the first version of the function and the second version of the function are written in code that does not allow overloading functions. In some embodiments the first version of the function and the second version of the function are written in C code. In some embodiments the memory partition is location within a vehicle. In some embodiments the table defines a respective memory address for each of the first version of the function and the second version of the function. In some embodiments the first image of the first version of the function comprises first assembler code and the second image of the second version of the function comprises second assembler coder. Some embodiments further comprising calling each version of the function in the stitched super-image based on the table.

Some embodiments include a system for overloading a function, the system comprising a memory partition comprising code defining a first version of the function and code defining a second version of the function, wherein the code defining the second version of the function is adjusted to not conflict with the code of the first version of the function, a table configured to selectively call either one of the first version of the function and the second version of the function, and a stitched super-image generated from the table and the memory partition. In some embodiments the first version of the function and the second version of the function are written in code that does not allow overloading functions. In some embodiments the first version of the function and the second version of the function are written in C code. In some embodiments the memory partition is location within a vehicle. In some embodiments the table defines a respective memory address for each of the first version of the function and the second version of the function. In some embodiments the first image of the first version of the function comprises first assembler code and the second image of the second version of the function comprises second assembler coder. In some embodiments each version of the function in the stitched super-image is called based on the table.

Some embodiments include a non-transitory computer-readable medium having non-transitory computer-readable instructions encoded thereon that, when executed by a processor, causes the processor to compile a first image of a first version of the function compile a second image of a second version of the function, and generate a stitched super-image by placing code defining the first version of the function and code defining the second version of the function into a memory partition, wherein the code defining the second version of the function is adjusted to not conflict with the code of the first version of the function, and generating a table that is used to selectively call either one of the first version of the function and the second version of the function. In some embodiments the first version of the function and the second version of the function are written in code that does not allow overloading functions. In some embodiments the first version of the function and the second version of the function are written in C code. In some embodiments wherein the memory partition is location within a vehicle. In some embodiments the table defines a respective memory address for each of the first version of the function and the second version of the function. In some embodiments the first image of the first version of the function comprises first assembler code and the second image of the second version of the function comprises second assembler coder. Some embodiments further comprise causing the processor to call each version of the function in the stitched super-image based on the table.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Vehicle Overview

In accordance with the present disclosure, systems and methods are provided that improve the operation of a vehicle (or multiple vehicles) by various improvements to configuration of hardware and/or software of the vehicle, multiple vehicles and/or server or servers configured to communicate with a vehicle or vehicles.

Figure 1:
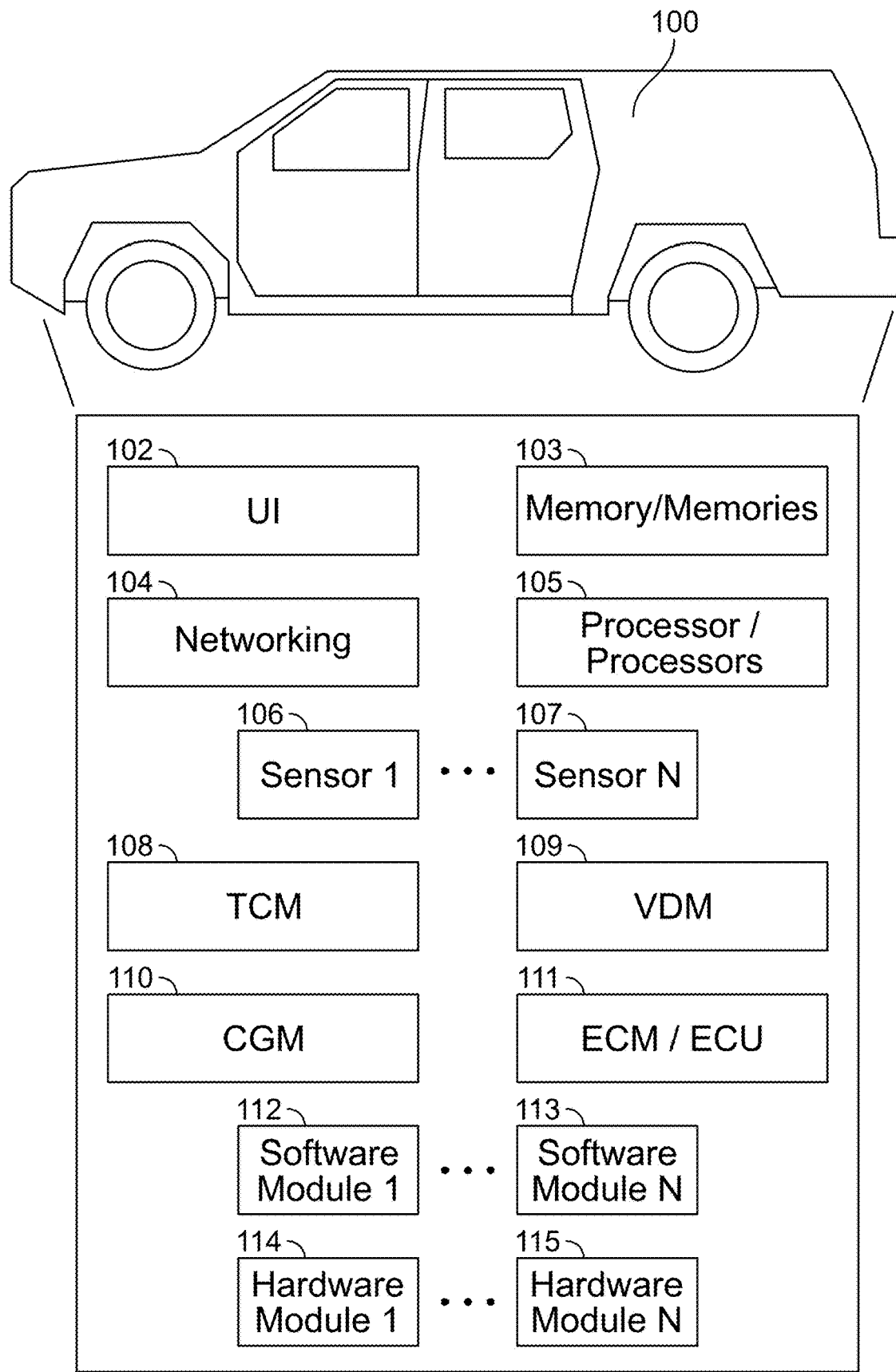
FIG. 1 shows a block diagram of components of a vehicle in accordance with some embodiments of the present disclosure.

FIG. 1 shows a block diagram of components of a vehicle 100 in accordance with some embodiments of the present disclosure. In some embodiments, the vehicle 100 may comprise any of a variety of suitable systems used for controlling and operating a vehicle. For example, the vehicle 100 may include engine or engine systems, battery systems, autonomous driving systems, steering system or systems, pump brake system, vent system, and other suitable systems or any combination thereof. In some embodiments, the vehicle may comprise one more electronic control units (ECUs) or circuitries (e.g., microcontrollers) for controlling some or all of the aforementioned systems. In some embodiments, the vehicle may include internal connections or networking components needed to link the systems of the vehicle.

In some embodiments, the vehicle may include a processor 105 or processors (e.g., a central processors and/or processors dedicated to their subsystems). A processor may comprise a hardware CPU for executing commands stored in memory 103 or software modules 112, 113, or a combination thereof. In some embodiments, the vehicle 100 may include one or more units of transitory memory and/or one or more units of non-transistor memory. In some embodiments, memory 103 may be a part of the vehicle's circuitries. In some embodiments, memory 103 may include hardware elements for non-transitory storage of commands or instructions, that, when executed by the processor 105, cause the processor 105 to operate the vehicle 100 in accordance with embodiments described above and below.

In some embodiments, a processor 105 may be communicatively connected to sensors 106, 107, a networking component, and user interface component or components. The sensors 106, 107 may include video sensors, audio sensors, gas sensors, pressure sensors, GPS sensors, radio antennas, video cameras, microphones, pressure sensors, weight sensors, gas sensors, sensors specific to vehicle capabilities, other sensors, or any combination thereof.

In some embodiments, the processor 105 may use data from sensors 106, 107 to operate the vehicle 100 and/or to perform other functions. In some embodiments, the processor 105 may receive user input via a user interface 102. In some embodiments, the user interface 102 may include a screen. In some embodiments, the processor 105 may communicate with a user device and other data sources via a network that may be accessed via a Networking Component 104.

In some embodiments, the vehicle 100 may include a plurality of software modules (e.g., software modules 1-N) 112, 113. In some embodiments, each of software modules 1-N 112, 113 may be controlled by the processor 105. In some embodiments, the vehicle 100 may include a plurality of hardware modules (e.g., hardware modules 1-N) 114, 115. In some embodiments, each of hardware modules 1-N 114, 115 may be controlled by the processor 105 or be operated by their own processor. In some embodiments, the vehicle 100 may include circuitries and software specific to function of operations of the vehicle 100. For example, the vehicle 100 may include one or more of Electric Control Modules (ECM) or Electric Control Units (ECU) 111 for controlling a motor or motors of the vehicle 100. Each ECM 111 may have access to various sensors, e.g., MAP: Manifold Absolute Pressure, IAT: Intake Air Temperature, MAF: Mass of Air Flow, CKP: Crank Shaft Position, CMP: CAM Shaft Position, ECT: Engine Coolant Temperature, O2: Oxygen Sensor, TP: Throttle Position, VSS: Vehicle Speed Sensor, Knock Sensor, APP: Acceleration Pedal Position, Refrigerant Sensor any other suitable or any combination thereof. The vehicle 100 may include a Transmission Control Module (TCM) 108 for transmission or transmissions of the vehicle, Vehicle Dynamics Module (VDM) 109, and Central Gateway Module (CGM) 110. The vehicle may also include any other suitable hardware or software systems.

Networking Overview

Figure 2:
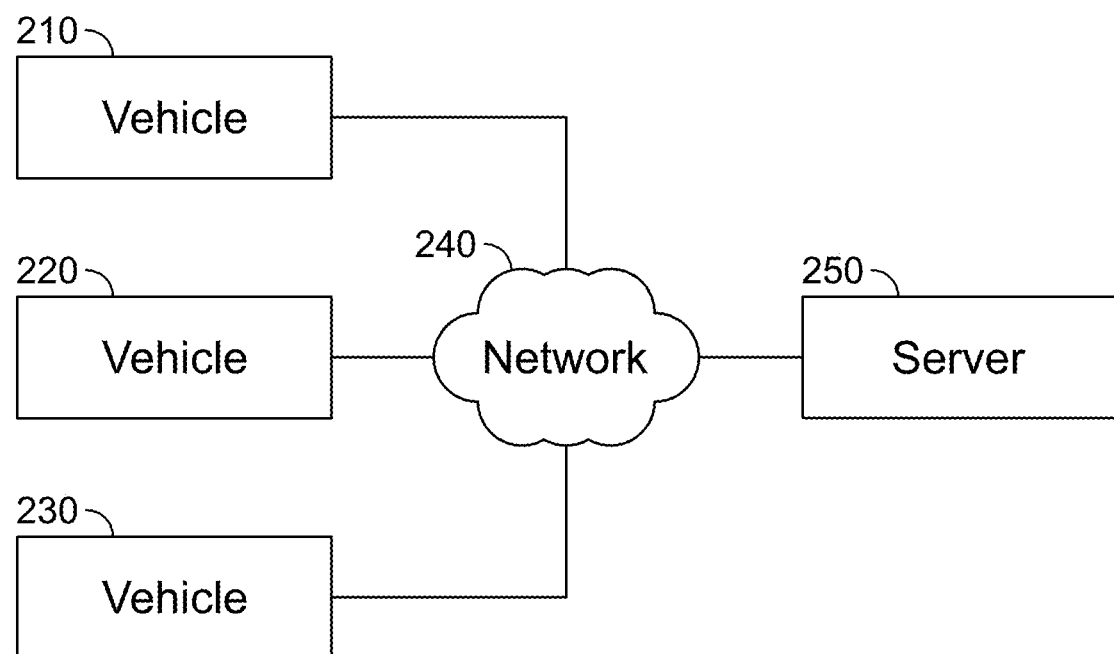
FIG. 2 shows a block diagram for a system for operating a vehicle (e.g., from FIG. 1), in accordance with some embodiments of the present disclosure.

FIG. 2 shows a block diagram for a system for operating a vehicle (e.g., from FIG. 1), in accordance with some embodiments of the present disclosure. The system may include multiple vehicles, including vehicle 210 (e.g., the vehicle of FIG. 1) and other vehicles 220 and 230, and server 250.

In some embodiments, the system may include network 240 communicatively interconnecting vehicles 210, 220, 230 and server 250. In some embodiments, network 240 may be the Internet, intranet, Bluetooth network, LAN, WAN, a Wi-Fi network, any other wired or wireless network, or any combination thereof.

In some embodiments, each vehicle 210-230 may comprise processing circuitry for carrying out functionalities of the vehicles as described in various embodiment of this disclosure. In some embodiments, each of vehicles 210-230 may comprise transitory and non-transitory memory for storing data and instructions necessary for operation of the vehicle. In some embodiments, each of vehicles 210-230 may comprise communication circuitry for communicating with server 250 over network 240. In some embodiments, the processing circuitry of each of vehicles 210-230 may be capable of collecting data from sensors or hardware or software modules (e.g., as shown in FIG. 1). Vehicles 210-230 may be consumer vehicles, or in some embodiments represent a fleet of commercial vehicles.

In some embodiments, server 250 may comprise a single server. In some embodiments, server 250 may comprise a plurality of servers distributed in one or more facilities. In some embodiments, server 250 may collect information from vehicles 210-230 (e.g., information generated by sensors of the vehicles 210-230) via network 240. In some embodiments, server 250 may send information to vehicles 210-230 via network 240 according to embodiments described above and below.

Core Architecture Overview

Figure 3:
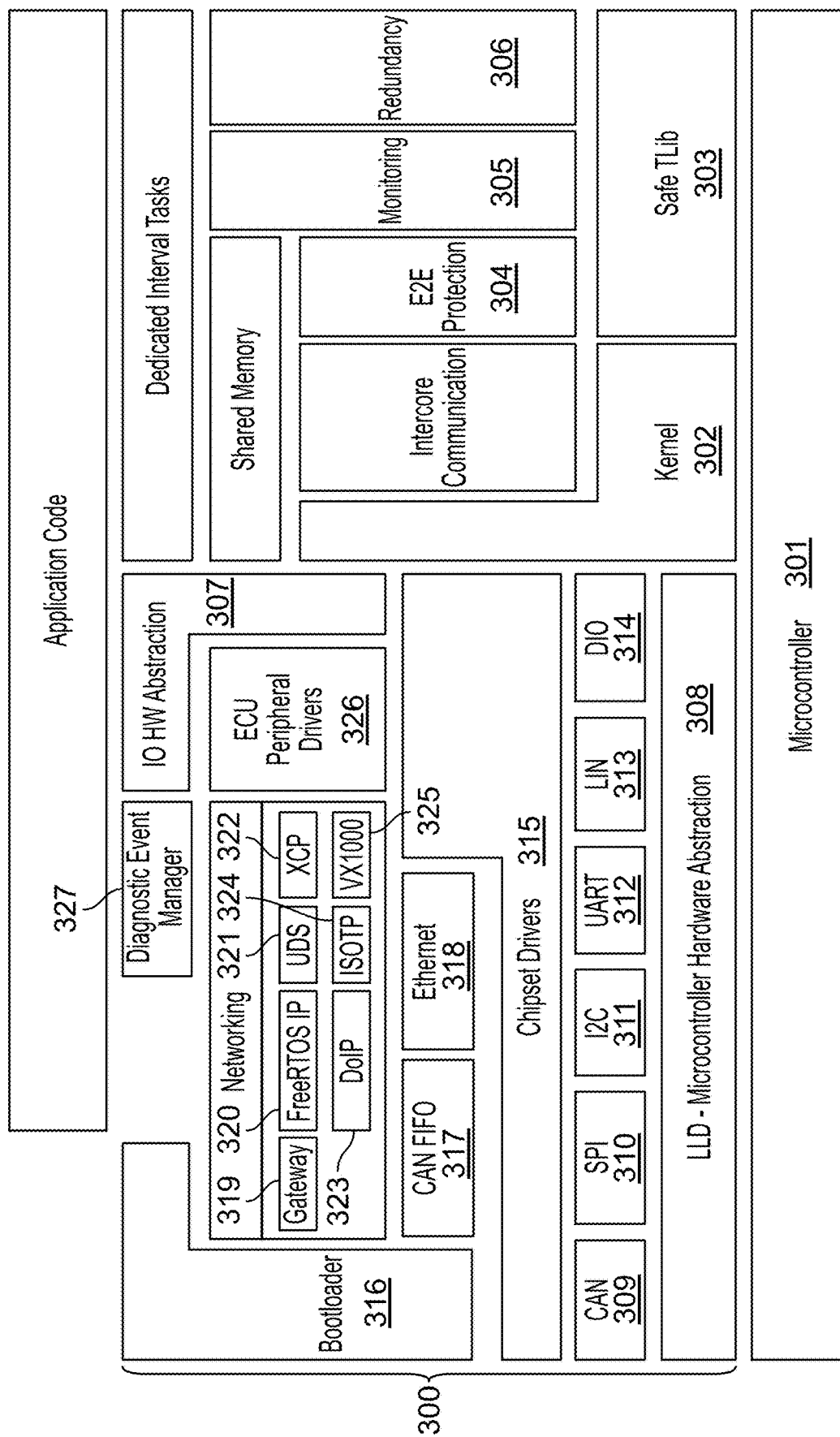
FIG. 3 shows an exemplary architecture of the vehicle of FIG. 1 in accordance with some embodiments of the present disclosure.

FIG. 3 depicts an exemplary architecture of the vehicle of FIG. 1 (e.g., of one of the processors cores of the vehicle, for example a core of the ECM). For example, the architecture shown in FIG. 3 may be implemented using processors and memory shown in FIG. 1. While implementation of a single core is shown, the vehicle may include any number of cores connected by buses or networking elements.

In some embodiments, the architecture may be implemented using a microcontroller 301. The microcontroller 301 may have access to a hardware abstraction module 307, an operating system kernel 302 (with inter-core commination functionalities) and self-test libraries 303. Further safety and security modules may include end-2-end (E2E) protection modules 304, monitoring modules 305, and redundancy module 306. Some or all of the modules may use shared memory. The core may also perform a portion dedicated to performance of interval tasks.

In some embodiments, the architecture includes a controller abstraction layer 308, which has access to Controller Area Network (CAN) 309, Serial Peripheral Interface (SPI) 310, Inter-Integrated Circuit (I2C) 311, Universal asynchronous receiver-transmitter (UART) 312, Local Interconnect Network (LIN) 313, and Digital Input/Output (DIO) 314 buses. The microcontroller 301 may also include chipset drivers 315, a bootloader 316, Controller Area Network First-in-First-Out (FIFO) queues 317 and an Ethernet component 318. Further networking module may also be included (e.g., including a gateway 319 for FreeRTOS communications 320, Uniform Data System (UDS) communications 321, Universal Measurement and Calibration Protocol (XCP) communications 322, Diagnostics Over Internet Protocol (DoIp) communications 323, ISO-Transport Layer (ISOTP) communications 324, VX1000 communications 325, and the like). The microcontroller 301 may also include ECU peripheral drivers 326, a hardware abstraction module 307, and a diagnostic event manager 327. The kernel 302 may then be used to execute application code stored in the memory. In some embodiments, the architecture of a core may include any other suitable hardware or software module.

The core enables the vehicle to access various functions and capabilities including communication, synchronization, and data collection. For example, the vehicle may communicate information, such as diagnostics or fault codes, between external test equipment and automotive control units (ECU) (using ECU peripheral Driver 326) over DoIP 323. This allows a vehicle system to, for example, track and analyze diagnostic information to improve failure detection. The core may also receive and send files to outside systems such as cloud servers via Controller Area Network (CAN) bus or Unified Diagnostic Services (UDS) protocol. These files may be for example from peripheral devices (e.g., signals from a pump brake module, from an engine module such as ECM, or any other core, or peripheral or sensor of a vehicle), or to other modules, its own applications, or other cores. This communication enables functions that incorporate data from different parts of a vehicle (i.e., brakes in communicating with a display unit, or storing a data snapshot after an ECU failure) or from different systems (i.e., reporting data to an external server).

In some embodiments, a system (e.g., a core as shown in FIG. 3) of a vehicle (e.g., as depicted in FIG. 1) may be able to receive messages and signals from external modules (e.g., from sensors, other modules of the vehicle such as TCM or VDM). The DBC files may be used to define how modules communicate with each other (e.g., a pump brake module, an engine module such as ECM, or any other core, peripheral or sensor of a vehicle). The system (e.g., core 300 as shown in FIG. 3) of a vehicle may also need to transmit data (e.g., data to other modules, to its own applications, or to other cores of other systems).

In one approach, the system includes individually programmed interfaces for receiving and interpreting data, and/or applications for transmitting the data. In some embodiments, the system may be executing in a real-time operating systems (RTOS). In RTOS's, tasks have priorities and are allowed to preempt each other. Due to preemption, one task may pause its execution when another task, with higher priority, is executed. Preemption may lead to a failure in the coherency of the data.

Figure 4A:
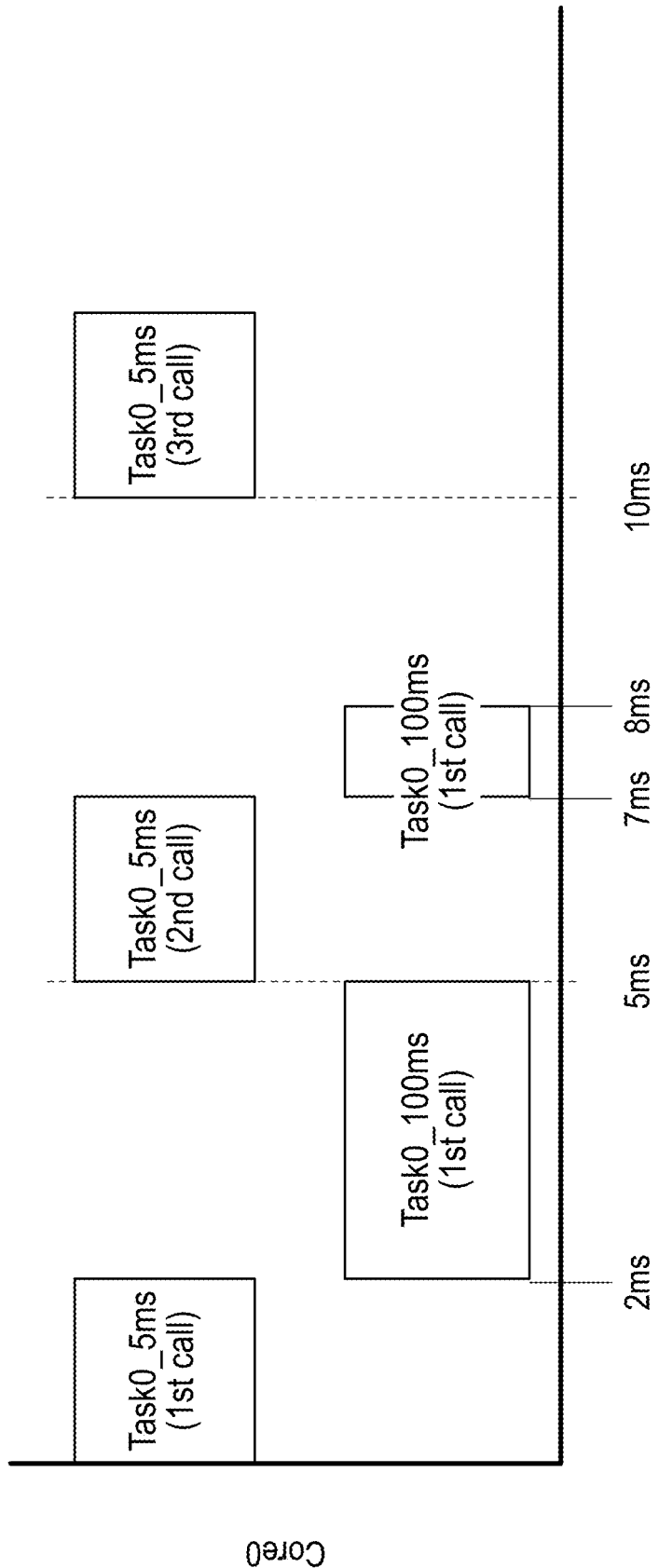
FIG. 4a shows an exemplary occurrence of preemption causing a synchronization problem in accordance with some embodiments of the present disclosure.

FIG. 4A shows exemplary occurrence of preemption causing a synchronization problem. For example, Task0_5 ms and Task0_100 ms may both become scheduled to run at t=0 ms on a system (e.g., a core). Because task0_5 ms has a higher priority, it is allowed to execute first, and thus begins executing at time t=0 ms. When task0_5 ms finishes (e.g., at t=2 ms), task0_100 ms is allowed execution time on the core (e.g., at t=2 ms), but task0_100 ms may not have enough time until a second call to task0_5 ms needs to run again (at t=5 ms). The operating system of the system will "preempt" task0_100 ms in favor of the higher priority task task0_5 ms, and run the second instance of task task0_5 ms to completion (e.g., until t=7 ms), before switching back to finish up the task0_100 ms task (e.g., t=7 ms). This preemption problematically cannot provide a guarantee that communication between task0_5 ms and task0_100 ms will be synchronized.

For example, task0_5 ms may be responsible for End-2-End (E2E) checking and unpacking of signal data (e.g., data received via a CAN bus). In this example, task0_100 ms may need to receive: (a) signal data and (b) E2E result of the check for that signal (that would be provided by task0_5 ms). For example, task0_100 ms may call one function to obtain the signal data during 2 ms-5 ms part of its execution and then call a different function to obtain the E2E status during 7 ms-8 ms part of its execution. However, since a second instance of task0_5 ms was executed between 5 ms-7 ms time period, the E2E status received by the task0_100 ms in the 7 ms-8 ms time period will not correspond to the signal data received by the task0_100 ms in the 2 ms-5 ms time period. This problem becomes more acute if task0_100 ms was running on a different core from task0_5 ms. The mismatch in data may cause desynchronization and other programming issues in the execution of task0_100 ms, which may require additional cycles to remedy or may even lead to system crash.

Previous solutions to this problem would execute the E2E calculations in the same partition in which the application code that requires the data executes from. This provides synchronization of the E2E and message data with the code since all information runs within the same context, however these such solutions have disadvantages. For one, message data needs to be synchronized between the context of the communication stack and the above-mentioned context. This would usually be handled by involving the operating system or a queue which is less portable and resource intensive. Also, if there is code running in other partitions, redundant calculations are required. These solutions also require the code to run in lockstep with data that is coming in.

Accordingly, a solution is provided to ensure synchronization between tasks, for example a method is provided to ensure that E2E data is synchronized with signal processing and sending data. In particular, a custom tool (e.g., a set of programming scripts) is provided that autogenerates a set of software agents (e.g., in C programming language) that allow a system (e.g. including one or more cores) to separate processing, transmission and receiving of messages in order to achieve better synchronization. In particular, E2E calculations for a receipt of a signal may takes place within a single task while software architecture of a core and of the application (that would receive or send the signal and E2E status) perform the necessary actions to ensure that information received with synchronicity when required. This provides for saving of CPU cycles on a core (e.g., core 300 shown in FIG. 3.)

Figure 4B:
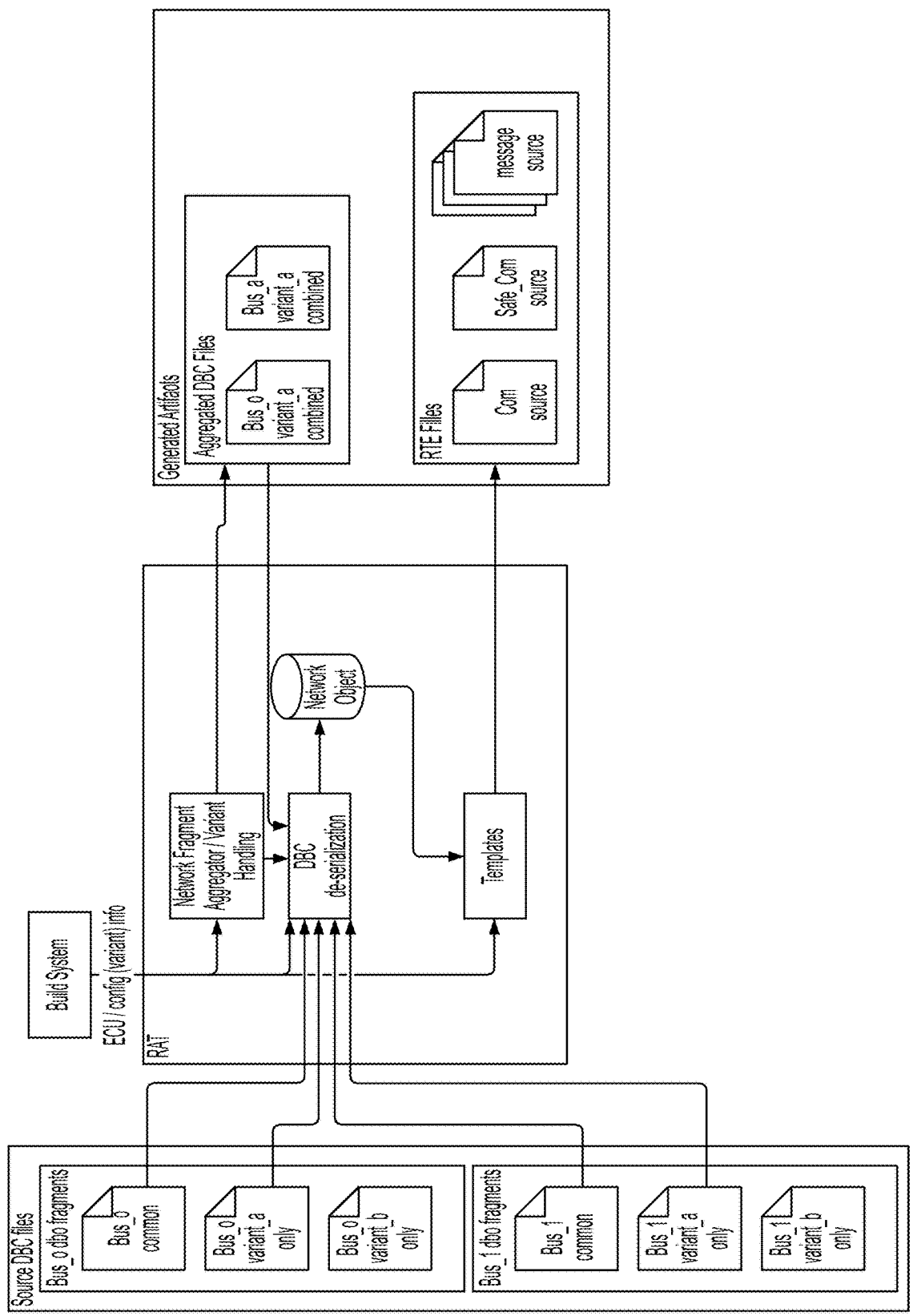
FIG. 4b shows an exemplary data flow diagram of generated software agents in accordance with some embodiments of the present disclosure.

FIG. 4B shows an exemplary data flow diagram of the generated software agents. In some embodiments, there are thousands of signals that each application in a vehicle (e.g., as shown in FIGS. 1-3) needs to receive and send. Additionally, there are messages that need to be routed through many networks to various endpoints in a system of the vehicle. Some messages need to be validated (e.g., using an E2E status). Human-generated code for handing receipt of messages and for E2E validation is error-prone and may incorporate errors into the system. Accordingly, the system herein auto-generates code based on DBC data, wherein the resulting code enables customized software agents to provide signal and E2E status synchronization. For example, code may be autogenerated for the following tasks: gatewaying of messages between networks, unpacking/packing signals between raw bytes and engineering values, handling of end-to-end protection for message/signal integrity, handling of message scheduling, variant management of communication networks, setting of communication related DTCs (Diagnostic Trouble Codes), enabling/disabling communication by network/message, and any other suitable communication-related tasks.

In some implementations, a preselected text-based descriptor file format (e.g., specially formatted DBC files or other serialized formats) is used to describe the network of the vehicle through multiple file fragments per bus. For example, the descriptor file format may require certain style of comments or stubbed out portions that provide the needed information but would not be executed. In another implementation, a descriptor file format may require data to be provided in a certain order and with certain marks (e.g., with pre-defined variable names). DBC files or any other suitable preselected-descriptor file format may be used by the code auto-generation software using the descriptor file format details. The code auto-generation software may use segments or fragments of these descriptor files to generate the source code. In this way a signal or message may be transferred with assurance that the code will compile and that the cores and applications will be able to access that message's or signal's value through a specified Application Programming Interface (API) without any further work or integration needed. The code auto-generation software may also handle variant management (e.g., as described later in connection with FIG. 15). In some embodiments, the code auto-generation software may include a framework for providing automated message redundancy (e.g., by switch a message's source in ad hoc manner when there are multiple message sources to choose from). In some embodiments, the code auto-generation software may include schema for a new file format for replacing DBC files.

The output of the code auto-generation software may be a set of programming files intended to be run on a top layer of the application stack of a core (e.g., a core of ECU) and/or with an application. The generated programming files comprising of one or more programming languages (e.g., C, C++, Javascript, etc.) may be responsible for processing data (e.g., by generating files that include actual usable values), for performing E2E verification for the signal data, and for sending the signal data to other cores or applications. E2E checking modules may be configured to validate a single message given a running state of past messages. E2E libraries may be written per the Automotive Open System architecture (AUTOSAR) specification. E2E checking may provide one of "error," "OK," "repeated," "no new data" or "wrong sequence" values needed to validate the signal message.

In some examples, the build system of the code auto-generation software may receive Source DBC files (e.g., in fragment form including common parts and variants). The build system may then use a network framer aggregator to perform variant handling and perform DBC de-serialization. The build system may use a pre-defined network object (e.g., that describes the network through multiple file fragments per bus) and provided templates to generate run-time environment objects (e.g., software agents described in more detail below in FIGS. 5-8). The build system may also create aggregated DBC files.

The resulting software agents may provide memory protection and safe execution environment. For example, all data received from a peripheral device needs to be performed in a safe environment. Additionally, memory protection needs to be active to protect memory needed for execution of key tasks (e.g., any process not qualified needs to be prohibited from accessing protected memory). To that end, memory (e.g., as shown in FIG. 1) may be divided into several portions (e.g., as defined by ISO 26262 standard): QM memory portion which may be a non-protected unqualified level of memory and various levels of ASIL portions (e.g., ASIL A-D) where each level of ASIL memory is more protected. The code auto-generation software generates code that is further explained in FIGS. 5-8.

Figure 5:
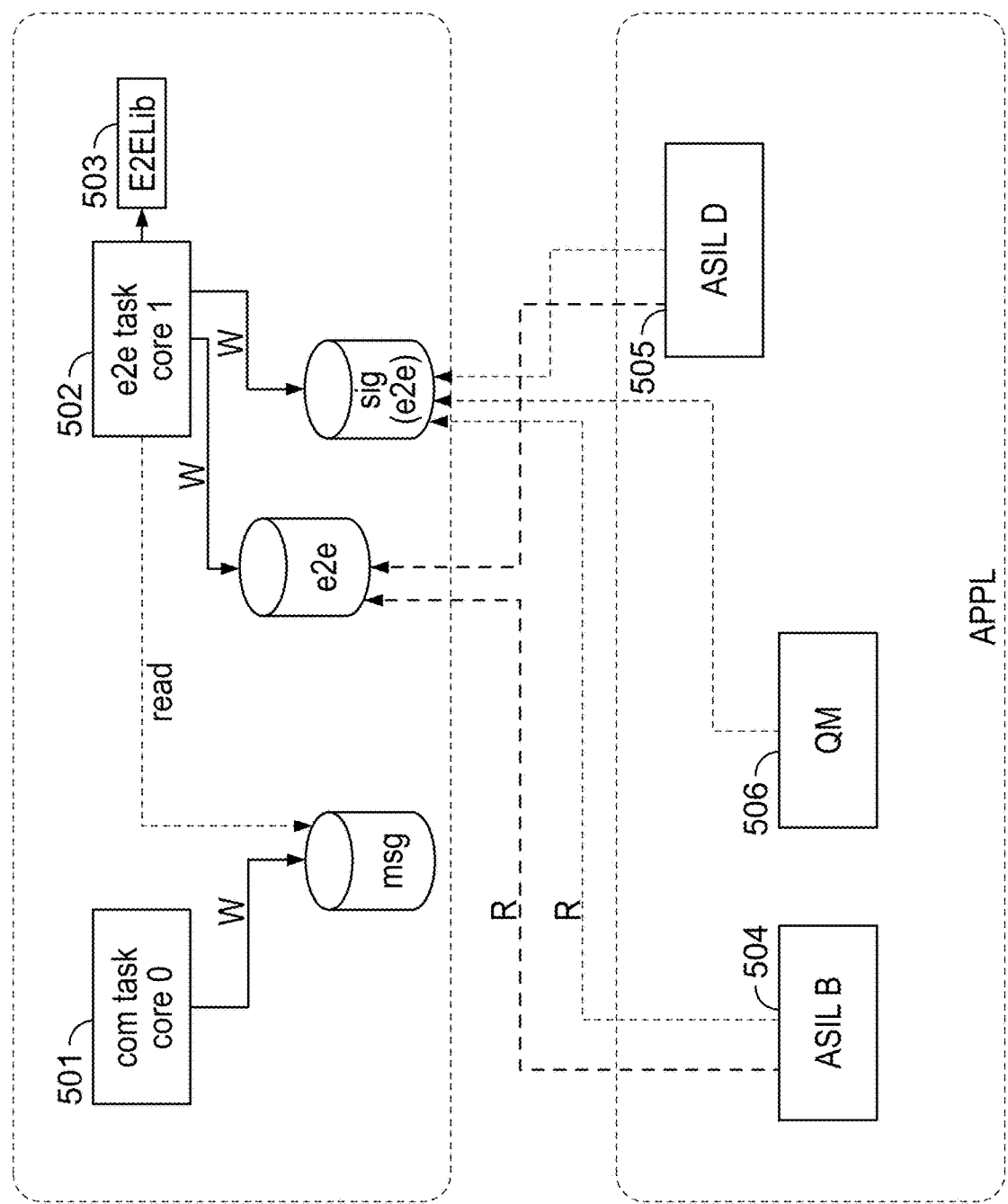
FIG. 5 shows exemplary software agents created by the build system of the code auto-generation software in accordance with some embodiments of the present disclosure.

FIG. 5 shows exemplary software agents created by the build system of the code auto-generation software that, when executed together, automatically provide E2E protection handing for a received signal.

In particular, tasks in the upper rectangle are executed by core 1 (e.g., on top layer of the application stack of core 1). While tasks in the lower level are executed by a higher-level application task that relies on the signal. As explained above in FIG. 4A, the application task needs to be synchronized with E2E protection task (to avoid the application from receiving E2E status that corresponds to a wrong message). To that end, when a message is received (e.g., from core 0), the message is read by the E2E task 502 on core 1 (e.g., using E2E libraries 503). The E2E task 502 on core 1 then writes both the signal and the E2E status of the signal in a form that may be used by the application. The E2E status may then be read by software that uses ASIL B 504 or ASIL D 505 level of memory protection, while the signal itself may be accessed by software that uses ASIL B 504, ASIL D 505 or QM 506 level of protection. Advantageously, all cross-core communications for every E2E message (e.g., as E2E check) happens at core 1, which allows support for higher level of memory protection (e.g., at ASIL D level). Since the E2E calculation all takes place within one task, the application will also perform necessary actions to ensure that information received is synchronized when required.

Figure 6:
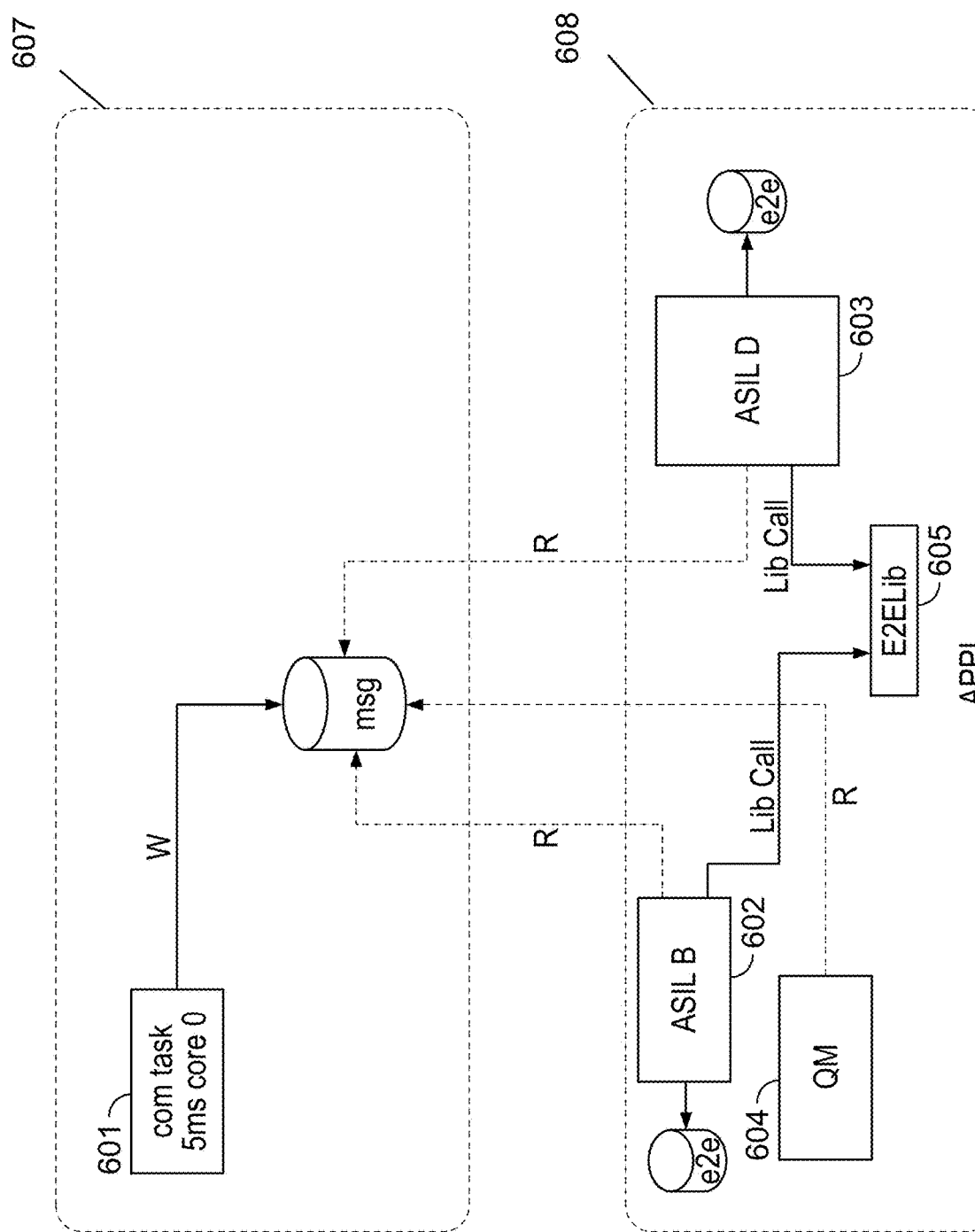
FIG. 6 shows an alternative version of exemplary software agents created by the build system of the code auto-generation software in accordance with some embodiments of the present disclosure.

FIG. 6 shows another version of exemplary software agents created by the build system of the code auto-generation software that, when executed together, automatically provide E2E protection handing for a received signal. In contrast to implementation of FIG. 5, the E2E checks are handled by the application. For example, E2E calculation may be performed in the same context as the code that consumes the calculation but requires the task to run at the same rate as the message.

In particular, tasks 601 in the upper level 607 are executed by core 1 (e.g., on top layer of the application stack of core 1). While tasks in the lower level 608 are executed by a higher-level application task that relies on the signal. To that end, when a message is received (e.g., from core 0), the message is read by core 1 that writes a message for use by the application. In this implementation, software that uses ASIL B 602, ASIL D 603 or QM 604 level or protection may all access the message. Then software that uses ASIL B 602 and software that uses ASIL D 603 may both access E2E libraries 605 and generate the E2E message (e.g., as E2E check). In such embodiments, the applications may perform the E2E check during every message cycle.

Figure 7:
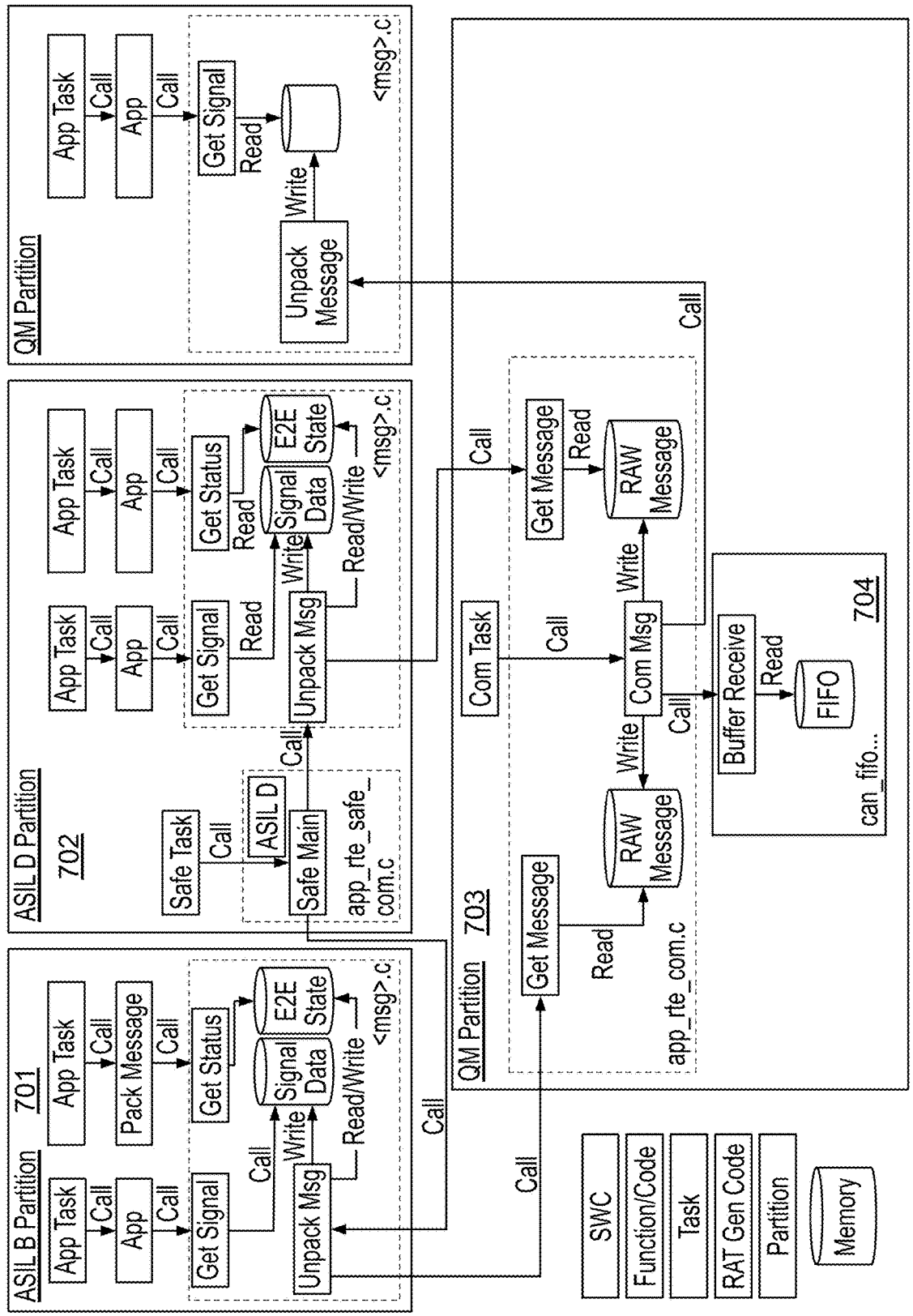
FIG. 7 shows details of an exemplary implementation of the signal receiving check described in FIG. 5 in accordance with some embodiments of the present disclosure.

FIG. 7 shows details of an exemplary implementation of the signal receiving check described in FIG. 5. Dotted fields indicate the code that was created by the build system of the code auto-generation software. As shown, the different code agents may reside in ASIL B 701, ASIL D 702, and QM 703 partitions and can be executed together to assure synchronization between app task and Com Task (which may correspond to tasks described in FIG. 4A). In this case, code in QM partition that runs the Com Task receives a message via the FIFO 704 buffer and writes the signal or message in a format that can be accessed by code in ASIL B 701, ASIL D 702, and QM 703 partitions. The code in ASIL B partition 701 may unpack the message and write signal data and the E2E state. These two values may then be accessed by an application in synchronized manner. The code in ASIL D 702 partition similarly may unpack the message and write signal data and the E2E state. These two values may then be accessed by an application in synchronized manner. In addition, code in ASIL D 702 may perform safety tasks. The code in QM partition 703 may only make signal data available to the application and not the E2E data.

Figure 8:
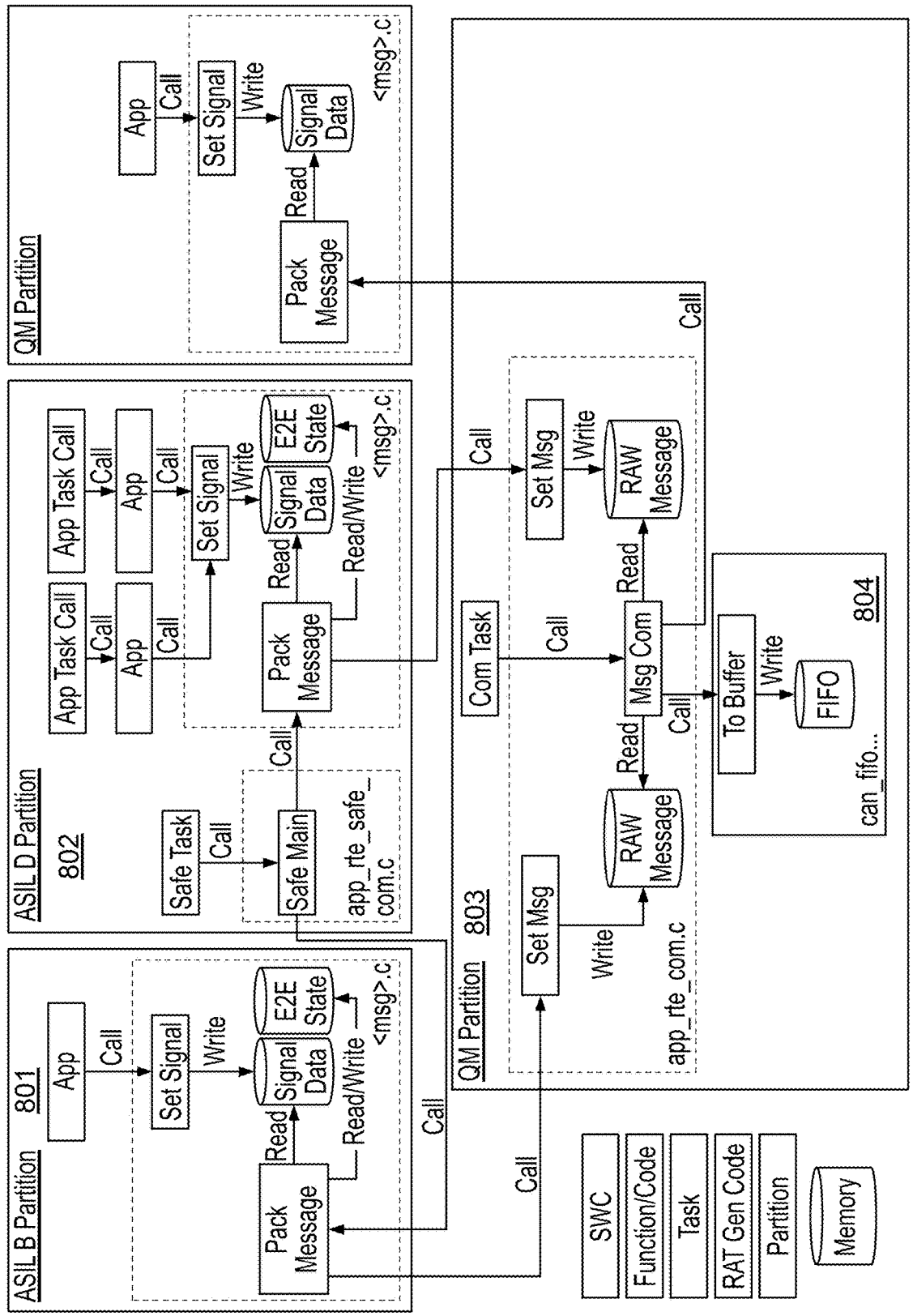
FIG. 8 shows details of an exemplary implementation of the transmission procedure described in FIG. 5 in accordance with some embodiments of the present disclosure.

FIG. 8 shows details of an exemplary implementation of the transmission procedure described in FIG. 5. Dotted fields indicate the code that was created by the build system of the code auto-generation software. As shown, the different code agents may reside in ASIL B 801, ASIL D 802, and QM 803 partitions and may be executed together to assure synchronization between app task and Com Task (which may correspond to tasks described in FIG. 4A). In this case, code in QM partition 803 that runs the Com Task writes a message to the FIFO buffer 804 based on signals provided by code in ASIL B 801, ASIL D 802, and QM 803 partitions. The code in ASIL B partition 801 may pack the message by combining signal data and the E2E state. The code in ASIL B partition 801 may also pack the message by combining signal data and E2E state. In addition, code in ASIL D 802 may perform safety tasks. The code in QM partition may only make signal data (and not the E2E status) to Com Task.

Figure 8A:
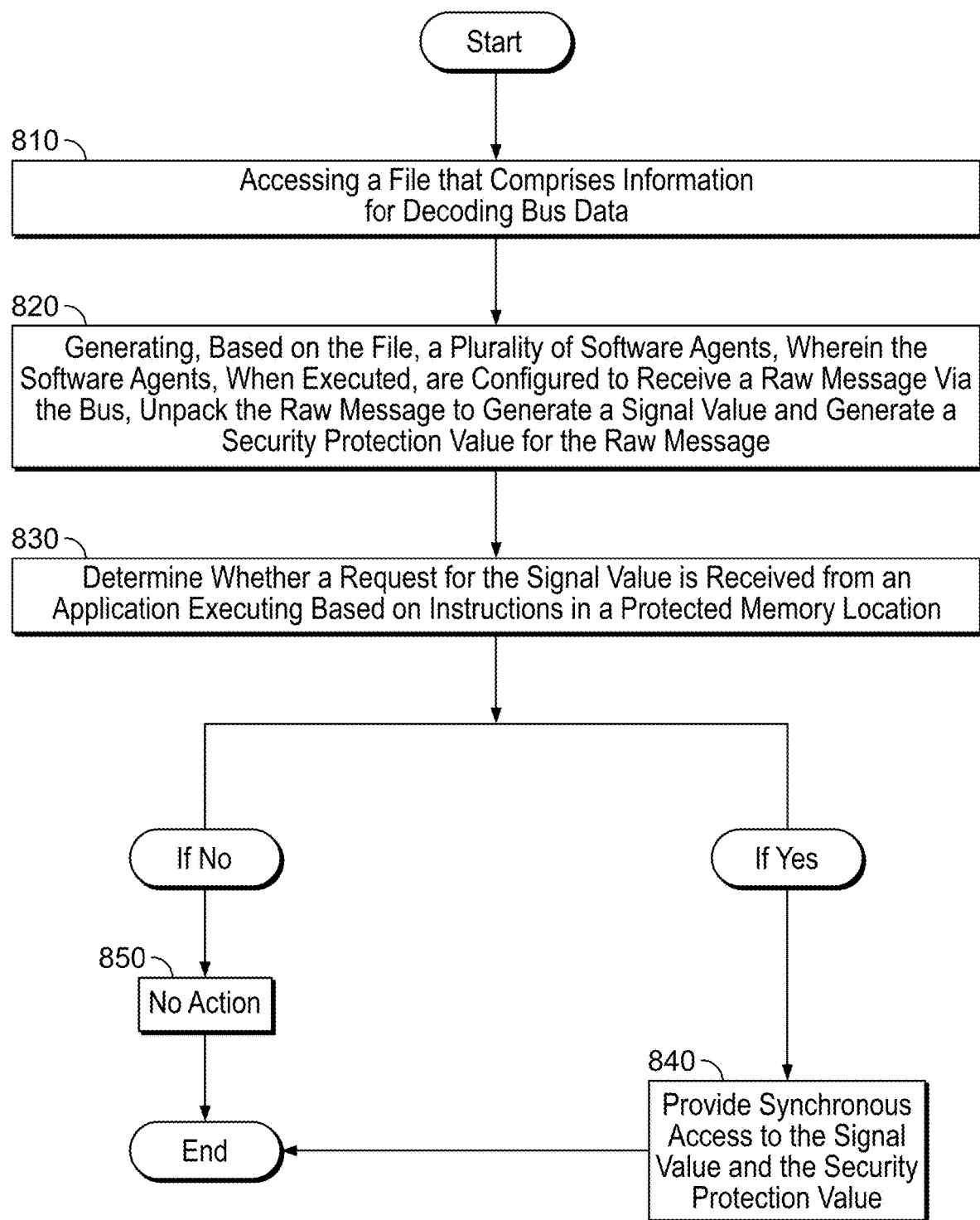
FIG. 8a shows a flow chart of illustrative steps for a method for synchronizing data, in accordance with some embodiments of the present disclosure.

Some embodiments include a method as in FIG. 8a comprising accessing a file that comprises information for decoding bus data in step 810, generating, based on the file, a plurality of software agents, wherein the software agents, when executed, are configured to receive a raw message via the bus, the raw message to generate a signal value, generate a security protection value for the raw message in step 820, and if a request for the signal value from an instance of an application executing based on instructions in a protected memory location is received in step 830, then provide synchronous access to the signal value and the security protection value in step 840. If no request is received at step 830, then the method moves to step 850 and no action is taken. In some embodiments generating the plurality of software agents comprises a first set of instructions for execution from a first unsecure memory partition, wherein the first set of instructions, when executed, is configured to receive a raw message from the bus, generating a second set of instructions for execution from a protected memory partition wherein the second set of instructions, when executed, is configured to unpack the raw message to generate the signal value, perform verification to generate the security protection value for the raw message, store the signal value and the security protection value, and synchronously transmit the signal value and the security protection value to the instance of an application, a third set of instructions for execution from a second unsecure memory partition wherein the third set of instructions, when executed, is configured to unpack the raw message to generate a signal value, transmit the signal value to the instance of an application. In some embodiments the bus is a Controller Area Network (CAN) bus. In some embodiments the first unsecure memory partition is a Quality Management (QM) partition. In some embodiments the protected memory partition is an Automotive Safety Integrity Level (ASIL) partition. In some embodiments generating the security protection value comprises generating an End-to-End (E2E) status.

In some embodiments, different hardware or software modules may need to exchange cryptographic key or keys (e.g., an ephemeral keys) to encrypt messages sent between each other. For example, TCM, VDM and CGM of a vehicle (e.g., as shown in FIGS. 1-3) may need to establish a secure communication channel between each pair of modules. However, the same techniques may be used between any software or hardware modules that need to exchange keys.

In one approach every module or node may have its own private key/public key pair for secure commination. However, this may be burdensome, especially when certificates are needed to verify key sources. To overcome this shortcoming, exemplary methods are provided for an improved key provisioning procedure.

Figure 9:
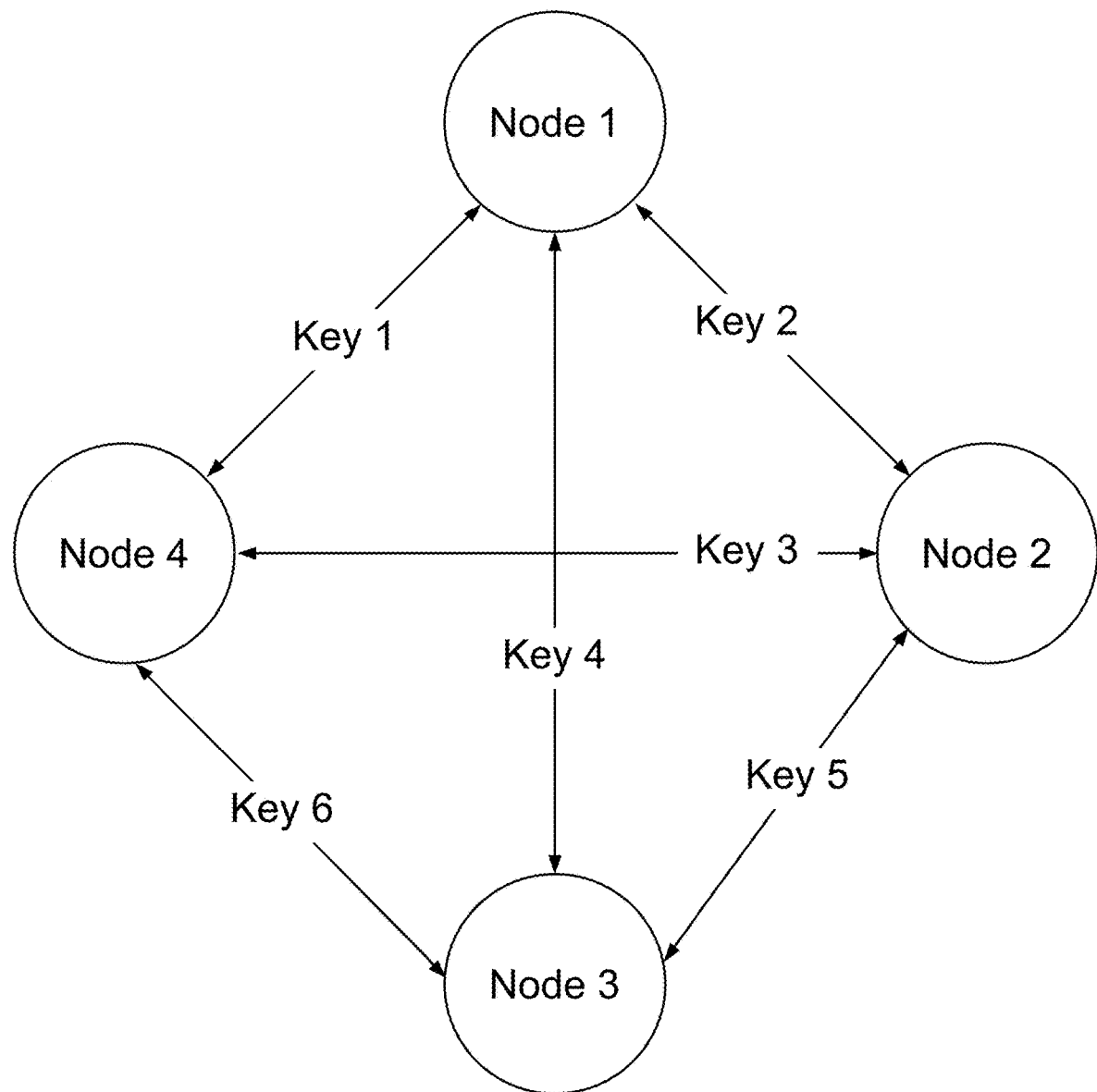
FIG. 9 shows an exemplary key exchange scenario in accordance with some embodiments of the present disclosure.

FIG. 9 depicts an exemplary prior art key exchange scenario. In this example, 4 nodes create pairwise symmetric communication keys (e.g., DEC keys, although any other suitable key may be used). As noted, pairwise key generation typically will require 6 key exchanges, which is burdensome. With 20 nodes, 190 key pairs would be needed for example. To overcome the problems of these prior approaches, a scheme is provided to generate ephemeral symmetrical keys between nodes based on leveraging a pre-shared key between one node and server. The techniques will be described for any two nodes and a server. In some examples, the CGM may act as a server and TCM, VDM may be nodes. However, any other suitable server and any other suitable nodes may be used. In some embodiments, the process may be repeated for other nodes that needs to share the provisioned key.

Figure 10:
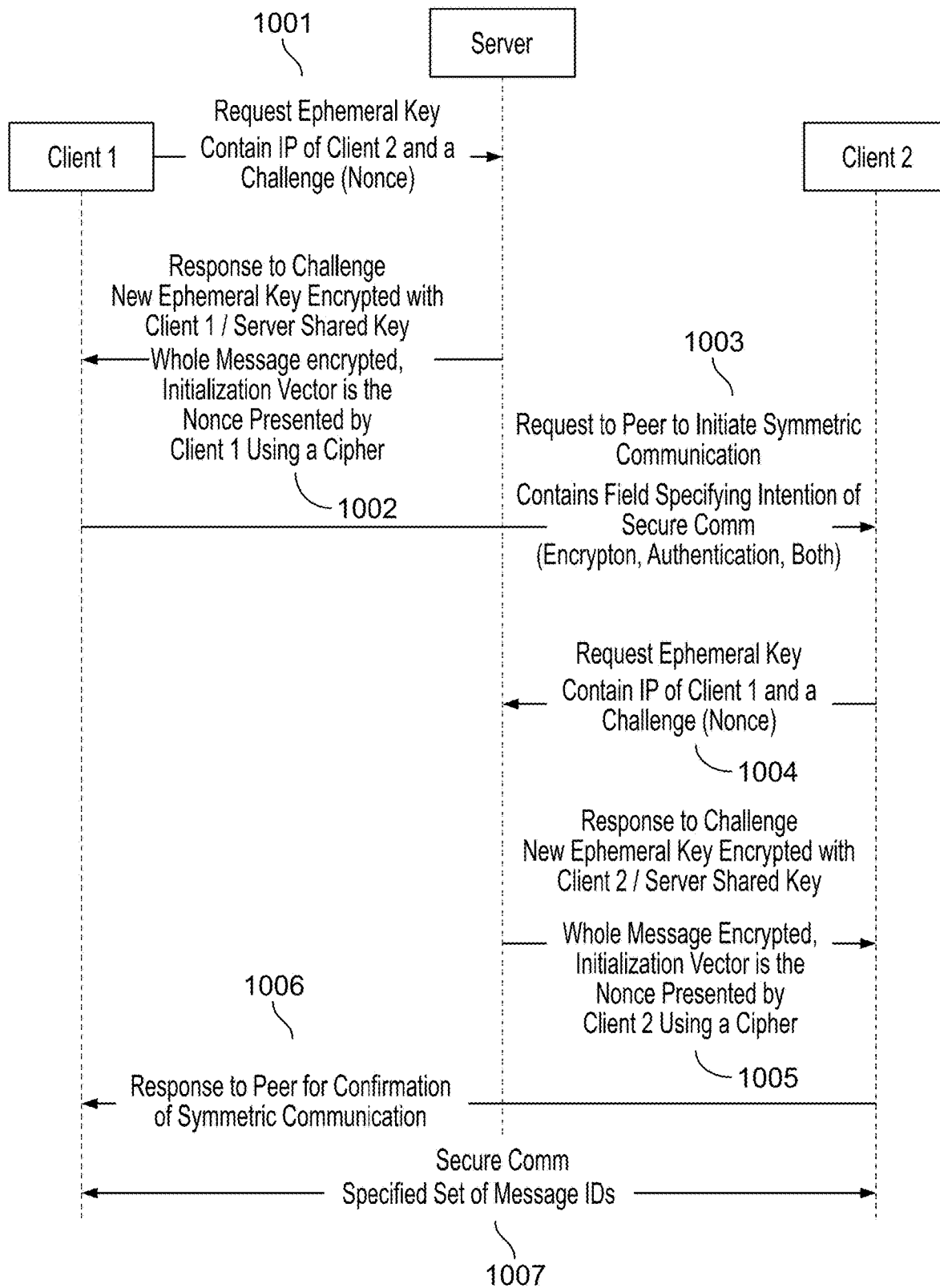
FIG. 10 shows an improved key provisioning protocol based on symmetric keys in accordance with some embodiments of the present disclosure.

FIG. 10 depicts an improved key provisioning protocol, based on symmetric keys, that can be used to provision new symmetric keys at runtime (or at any other time) between multiple nodes. The solution allows secure provisioning of new symmetric keys using only previous symmetric keys. The technique is secure against eavesdropping and man-in-the-middle attacks. To deploy the solution, one node in the network may be designated as a key server, and the rest designated as key clients. As a first step every client has a symmetric key permanently provisioned between itself and the server. This minimizes the need for permanent keys. For example, with 20 nodes, only 20 keys are needed instead of 190 key pairs. The pre-shared keys allow communication of a node with the server node and can also be leveraged to create ephemeral keys for use for encrypting communications between nodes.

As shown in FIG. 10, client 1 would like to create a secure channel with client 2 by sharing an ephemeral symmetric key. Client 1 requests a symmetric key from the key server 1001 (e.g., a newly created ephemeral key). In some embodiments, the request includes the address of the target node for channel creation (e.g., IP address of client 2), and a random number (e.g., 16-bit number) generated by client 1. The random number may be used as a challenge question for the server. For example, the server can be expected to re-transmit a reply based on that number when replying with the key to help client 1 validate the server by examining the received challenge response. This message may be sent without encryption or it may be encrypted using a pre-shared key for client 1/Server.

Before a certain pre-set time period has expired, the server may reply to client 1 with a message that includes the newly provisioned key and a response to the challenge 1002. The newly provisioned key may be created using any suitable key creation technique (e.g., as defined in defined in IEEE Std 1363-2000 standard). The response to the challenge may be a hash (e.g., Cipher-based Message Authentication Code hash) of the random number sent by client 1. The message may also be padded to comply with encryption block size. The entire message may be encrypted using a key that was pre-shared for the client 1/Server pair (e.g., using a cipher). In some embodiments, the random number created by client 1 may be used as initialization vector for the encryption algorithm.

Client 1 may then check the hash before proceeding. After the hash check, Client 1 may send a message to Client 2 to notify Client 2 that Client 1 would like to initiate secure communication with Client 2 1003. This may be an un-encrypted (e.g., User Datagram Protocol (UDP) message. The messages may inform client 2 (e.g., via bit filed) whether the channel will require encryption, authentication, or both. Client 2 now becomes apprised that the server has already generated an ephemeral key for this transaction. Client 2 may now send a message to the server to request of copy of the newly provisioned ephemeral key for itself 1004.

Client 2 may now send a request for the ephemeral key to the server 1004. The request may include address of the desired node (e.g., IP address of client 1) and a random number generated by client 2 (e.g., a 16 bit number). This message may be sent without encryption or it may be encrypted using a pre-shared key for Client 2/Server.

The server may verify that client 1 has indeed previously requested a channel with Client 2 before responding to client 2. The response message to client 2 1005 may include: (a) a response to the random number challenge (e.g., a hash of the random number generated by client 2), and (b) the same key that was provisioned at the request of client 1. The message may also be padded to comply with encryption block size. The entire message may be encrypted using a key that was pre-shared for the client 2 Server pair (e.g., using cipher). In some embodiments, the random number created by client 2 may be used as initialization vector for the encryption algorithm.

Client 2 may check the response hash before proceeding 1006. After this, since client 1 and client 2 are in possession of the same key, they may leverage that key for secure communication (e.g., for signing or encrypting messages between each other). In some embodiments, the communication may be performed over normal UDP or Transmission Control Protocol (TCP) messages, or any other suitable messages.

Figure 11:
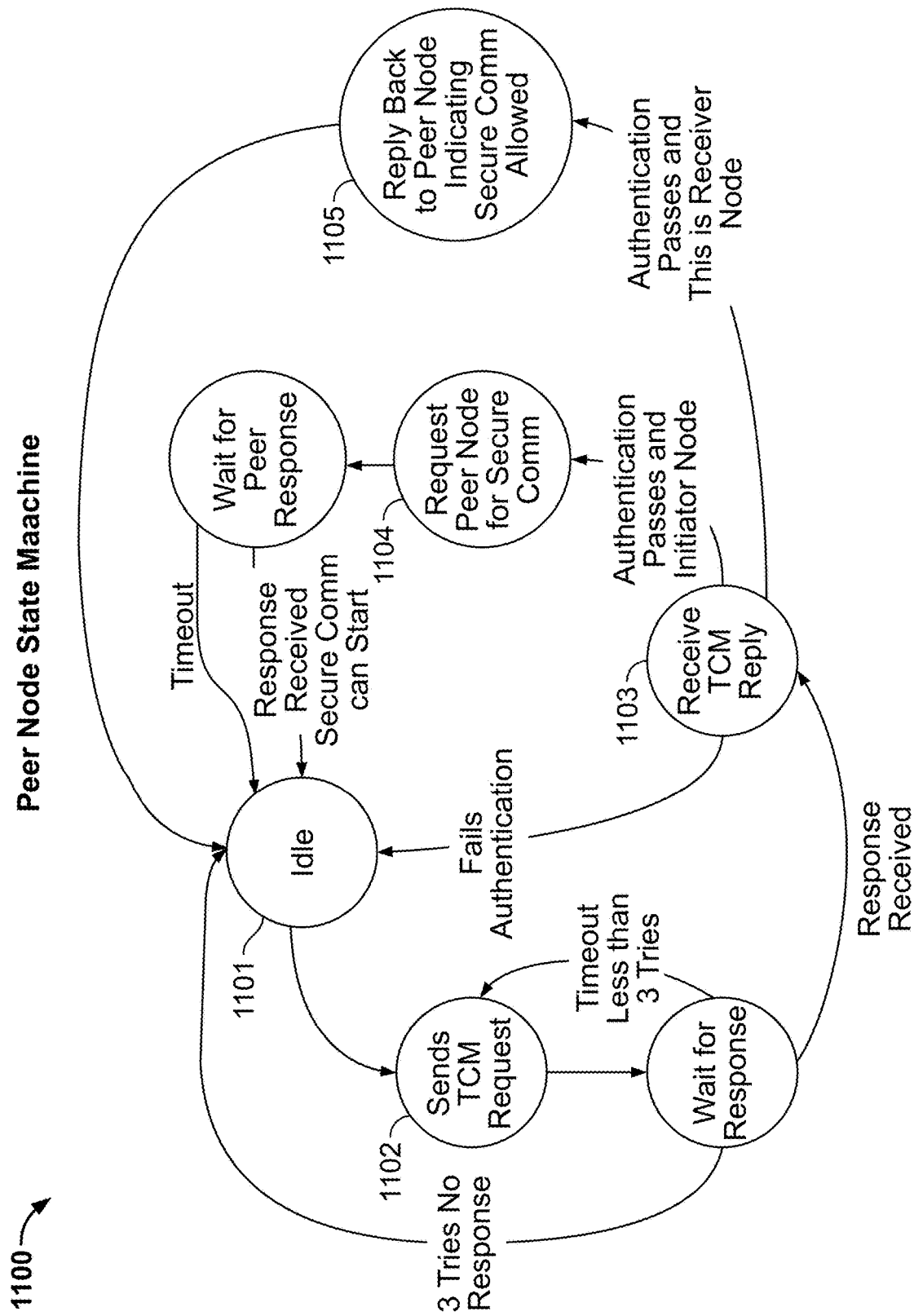
FIG. 11 shows a state machine for a node in an encryption algorithm in accordance with some embodiments of the present disclosure.

FIG. 11 shows a state machine 1100 for a node in this algorithm. For example, from the "Idle" state 1101, the node may send a key request 1102 (e.g., to the TCM) and wait to retry a predetermined number of times. In the initiator mode, when a key reply is received 1103 (and if authentication does not fail), the node may query the peer for secure connection 1104. If the peer reply is received, the state returns to "idle" 1101 and communication with the peer may begin. In the receive mode, the node will reply back to the peer to indicate that same commination is allowed 1105.

Figure 12:
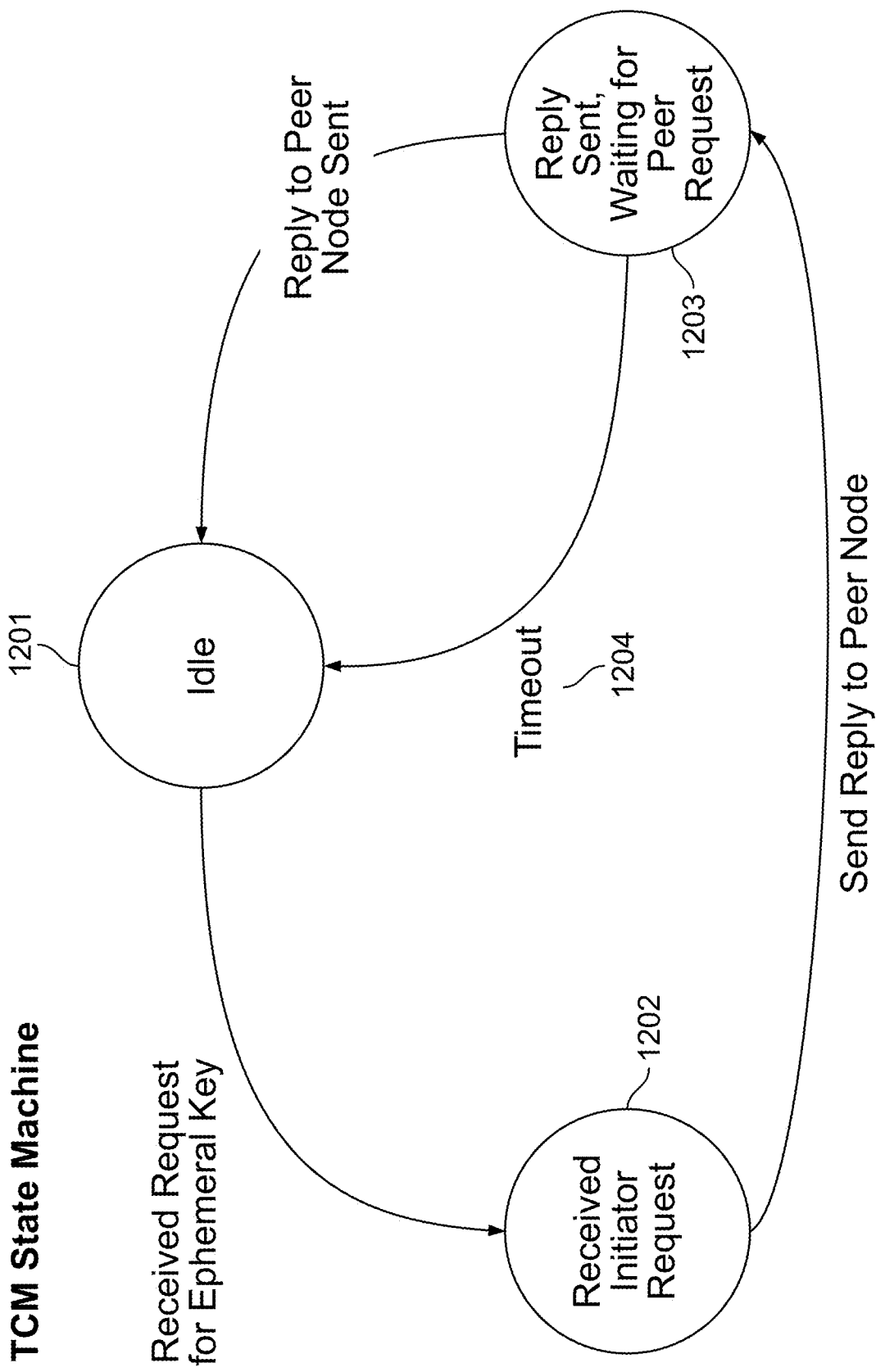
FIG. 12 shows a state machine for a key server in an encryption algorithm in accordance with some embodiments of the present disclosure.

FIG. 12 shows a state machine for a key server in this algorithm. From the "idle" state 1201, the server may receive an initiation request 1202. In response, the server sends a reply 1203 or times out 1204 and returns to the "idle" state 1201.

Figure 12A:
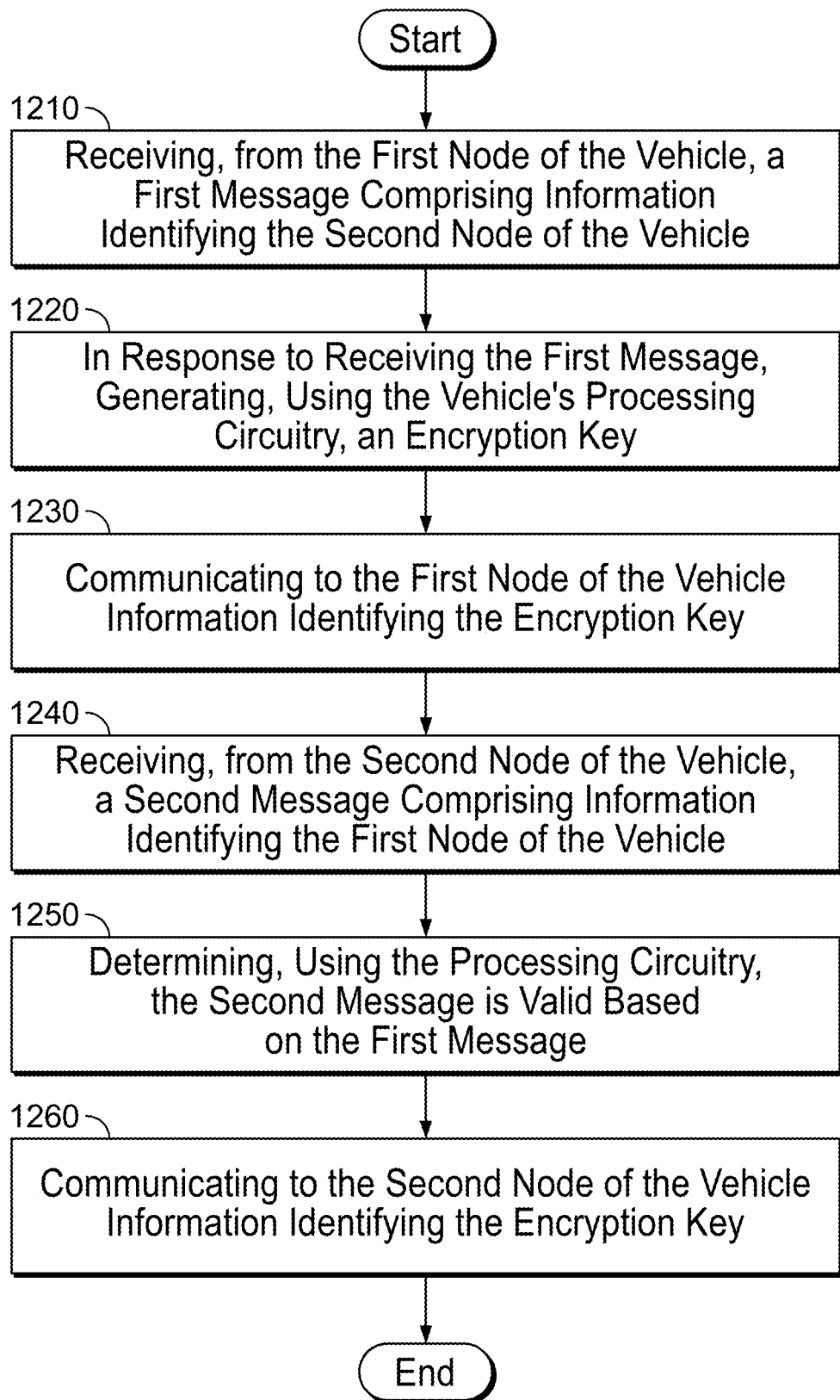
FIG. 12a shows a flow chart of illustrative steps for a method for establishing secure communications between a first node and a second node within a vehicle, in accordance with some embodiments of the present disclosure.

Some embodiments include a method for establishing secure communications between a first node and a second node within a vehicle as in FIG. 12*a*, the method comprising the steps of receiving, from the first node of the vehicle, a first message comprising information identifying the second node of the vehicle 1210, in response to receiving the first message, generating, using the vehicle's processing circuitry, an encryption key 1220, communicating to the first node of the vehicle information identifying the encryption key 1230, receiving, from the second node of the vehicle, a second message comprising information identifying the first node of the vehicle 1240, determining, using the processing circuitry, the second message is valid based on the first message 1250, and communicating to the second node of the vehicle information identifying the encryption key 1260. In some embodiments the first message further comprises a random number generated by the first node of the vehicle. Some embodiments include communicating a hash of the random number to the first node of the vehicle. In some embodiments the second message further comprises a random number generated by the second node. Some embodiments include communicating a hash of the random number to the first node of the vehicle. In some embodiments, the first node of the vehicle and the second node of the vehicle are on a shared bus in the vehicle. In some embodiments communicating to the first node of the vehicle and the communicating to the second node of the vehicle are done over the shared bus.

Figure 13:
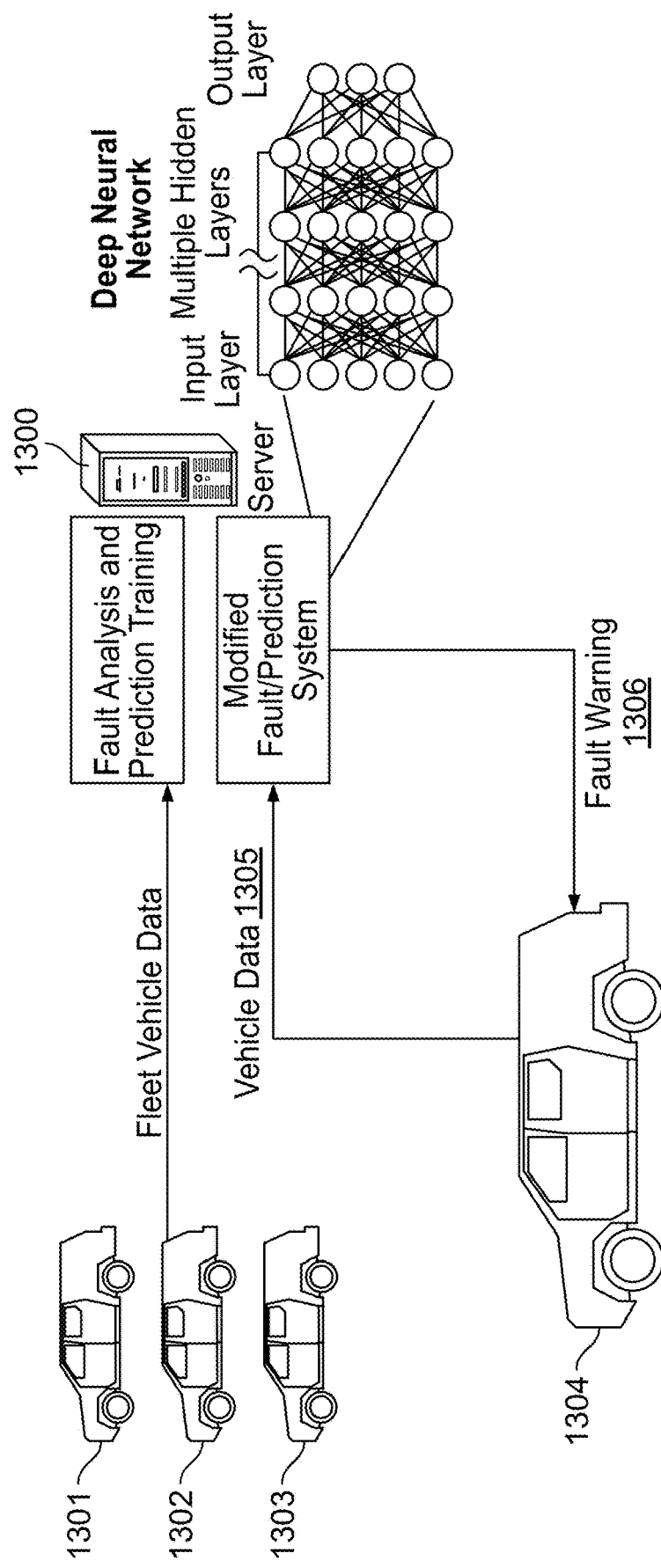
FIG. 13 shows an exemplary system for improving failure detection in circuitries or components of a vehicle in accordance with some embodiments of the present disclosure

FIG. 13 depicts an exemplary system for improving failure detection in circuitries or components of a vehicle (e.g., a vehicle depicted in FIG. 1). For example, the failure detection may be performed by a server 1300 (e.g., as depicted in FIG. 2). In some embodiments the server may have access to metrics data from multiple vehicles 1301, 1302, 1303, 1304 within a commercial fleet environment or vehicles 1301, 1302, 1303, 1304 may represent a set of consumer vehicles in communication with a server associated with an manufacturer of the vehicles. For example, the server may be in constant or periodic communication with each vehicle in the fleet using networking circuitries of the server and the fleet (e.g., over cellular network or any other suitable type of a network). The server may collect data 1305 from all circuities of the vehicles in the fleet. In one example, the server may collect ECU metrics data for all vehicles in the fleet.

After the server collects ECU metrics from a set of vehicles, the server can store the metrics data in its database. The server may analyze the metrics in comparison to thresholds and determine how often a certain issue (e.g., a fault) occurs throughout the fleet and how that fault correlates with the metrics. By keeping track of this information, the server may be able to provide early failure detection in a vehicle. In some embodiments, the server may transmit an early warning 1306 to the vehicle indicating a fault and urging repair or another suitable action.

For example, the server may collect sensor data for each ECU of each vehicle to record motor load, battery state or charge, coolant temperature, motor temperature, motor RPM, air flow, any other suitable metrics, or any combination thereof. Further complex ECU metrics may include current and average processor load, any processor faults, RAM and non-volatile memory utilization (average and current), ECU core temperature (current and average), network load (average and current), up time history, any other suitable processor metric or any combination thereof. The server may also collect health information for any element of the motor, e.g., age and performance for any part of the motor may be collected. The server may also receive software crash or malfunction reports from each vehicle in the vehicle fleet. The server may correlate the occurrences of the crashes with the state and history of metrics of the vehicles at the time of the crash or prior to the crash. The correlation may grow stronger as more crash or malfunction reports are received from other vehicles. For example, the age or poor performance of a certain motor part may become correlated with imminent malfunction. In some embodiments, a vehicle may report information to the server to both be analyzed for discovery of correlations and receive faut warnings of correlations itself. That is, a vehicle may both contribute to the system's knowledge while benefiting from the system itself. When the server is certain of the correlation (e.g., of the correlation exceeds a certain threshold), the server may transmit imminent fault warnings to a vehicle that has a part with a condition that is correlated with the fault. In some embodiments, warnings may be sent based on correlation of any metric or combination of metrics with a particular fault. The warnings may include a notification about which part of the vehicle needs service or replacement. The server may similarly collect and generate data for any other module of the vehicle.

In some embodiments, the server may utilize a machine learning model (e.g., a neural net) to predict fault. In such embodiments, the server trains the machine learning model with metrics states known to cause a fault. Once trained, the machine learning model may accept as input current metrics of a vehicle (e.g., ECU metrics) and output whether or not an imminent fault is likely. If the fault is likely, the server may send an appropriate notification to the vehicle. In some embodiments, the model is repeatedly updated as the server collects new data. In some embodiments, the model is located at the remote server.

In some embodiments, the notification to the vehicle may indicate the expected fault. In some embodiments the notification may indicate a range in which the expected fault is likely to occur. This range may be in miles, hours, or any other relevant unit. For example, the server may warn the vehicle that it is likely to overheat in 20 miles based on a detected state of a battery or motor part. In another example, the server may warn the vehicle that a headlight is likely to go out in 12 hours based on an identified state of a lamp or other circuitry associated with the vehicle. In some embodiments, the notification may describe the correlation. For example, it may state that the vehicle has driven 65,000 miles which indicates that it is likely that the motor needs maintenance.

In some embodiments, the notification may include a percentage likelihood that a fault will occur. For example, the server may warn that the vehicle has a 40% chance of battery failure. In some embodiments the notification may include indications of severity such as color changes or animation on a vehicle display viewable by the driver, or the indications may be delivered to a mobile device (e.g., cell phone having a mobile application associated with the server installed thereon) associated with the user. For example, an urgent risk may be in red and blinking while a minor risk may be in yellow. Severity may be assessed for example based on likelihood and potential danger or inconvenience. In some embodiments, the server may cause a change in an operating parameter of a vehicle to avoid or mitigate the fault. Such a change may be performed to the vehicle wirelessly by a remote server using a software or other update.

In some embodiments the server may receive data from sources other than the vehicles. For example, the server may communicate with systems providing data on weather, traffic patterns, geographical location of the vehicle, altitude, route, and driver profile, among others. The server may then incorporate this additional data in the analysis of correlation of a fault. For example, the server may find that a certain fault, such as battery performance, shows a correlation with outside temperature. The server may then, after having received weather predictions for the upcoming hours, warn a vehicle that a fault is likely to occur. For example, in the case of battery performance being correlated with temperature, the server may learn that the temperature is likely to drop below a threshold at which point the temperature will impair battery performance. The server may then warn the vehicle of the upcoming change or upcoming potential for impaired performance. Alternatively, the server may find for example that another malfunction is common at frequent stops and may receive information regarding upcoming traffic. The server may learn of traffic ahead that is likely to create frequent stopping. In that case, the server may similarly warn the vehicle that a failure is likely to occur. In another example, the server may find that vehicles in a certain geographical location have a higher correlation to a specific fault and warn only vehicles in that location of the specific fault. In some embodiments the server may suggest an action. For example, in the scenario where traffic patterns may increase the risk of a failure, the server may communicate to the system that an alternate route is recommended.

Figure 13A:
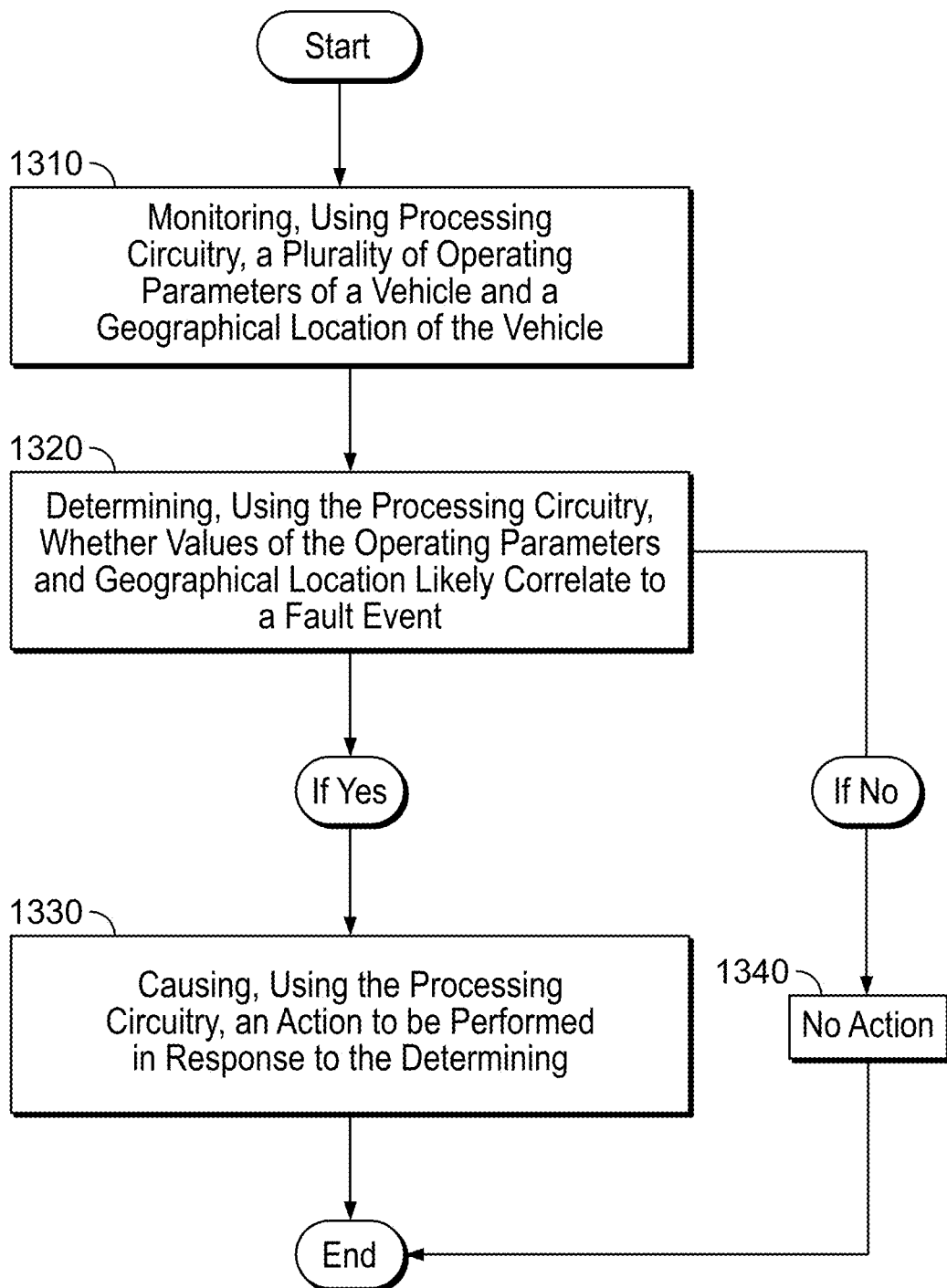
FIG. 13a shows a flow chart of illustrative steps for a method for predicting a fault event in a vehicle, in accordance with some embodiments of the present disclosure.

Some embodiments include a method for predicting a fault event in a vehicle as in FIG. 13a, the method comprising monitoring, using processing circuitry, a plurality of operating parameters of a vehicle and a geographical location of the vehicle in step 1310. Upon determining, using the processing circuitry, that values of the operating parameters and geographical location likely correlate to a fault event in step 1320, wherein the correlation is based on a model trained using respective values of the operating parameters for a set of vehicles and respective geographical locations of the set of vehicles experiencing respective fault events, causing, using the processing circuitry, an action to be performed in response to the determining in step 1330. If no correlation is detected, the method moves to step 1340 and. no action is taken. Some embodiments also include transmitting to a remote server the operating parameters and the geographical location of the vehicle, wherein determining that the values of the operating parameters and the geographical location likely correlate to the fault event comprises receiving from the remove server information indicative of the correlation. In some embodiments the model is located at the remote server. In some embodiments causing the action to be performed comprises causing a notification to be provided indicative of the fault event. In some embodiments causing the action to be performed comprises causing a change to at least one of the plurality of operating parameters to avoid the fault event from occurring. In some embodiments causing the action to be performed comprises causing at a remote server the action to be performed, wherein the action is performed within the vehicle. In some embodiments the model is repeatedly updated based on new data provided by the set of vehicles.

Figure 14:
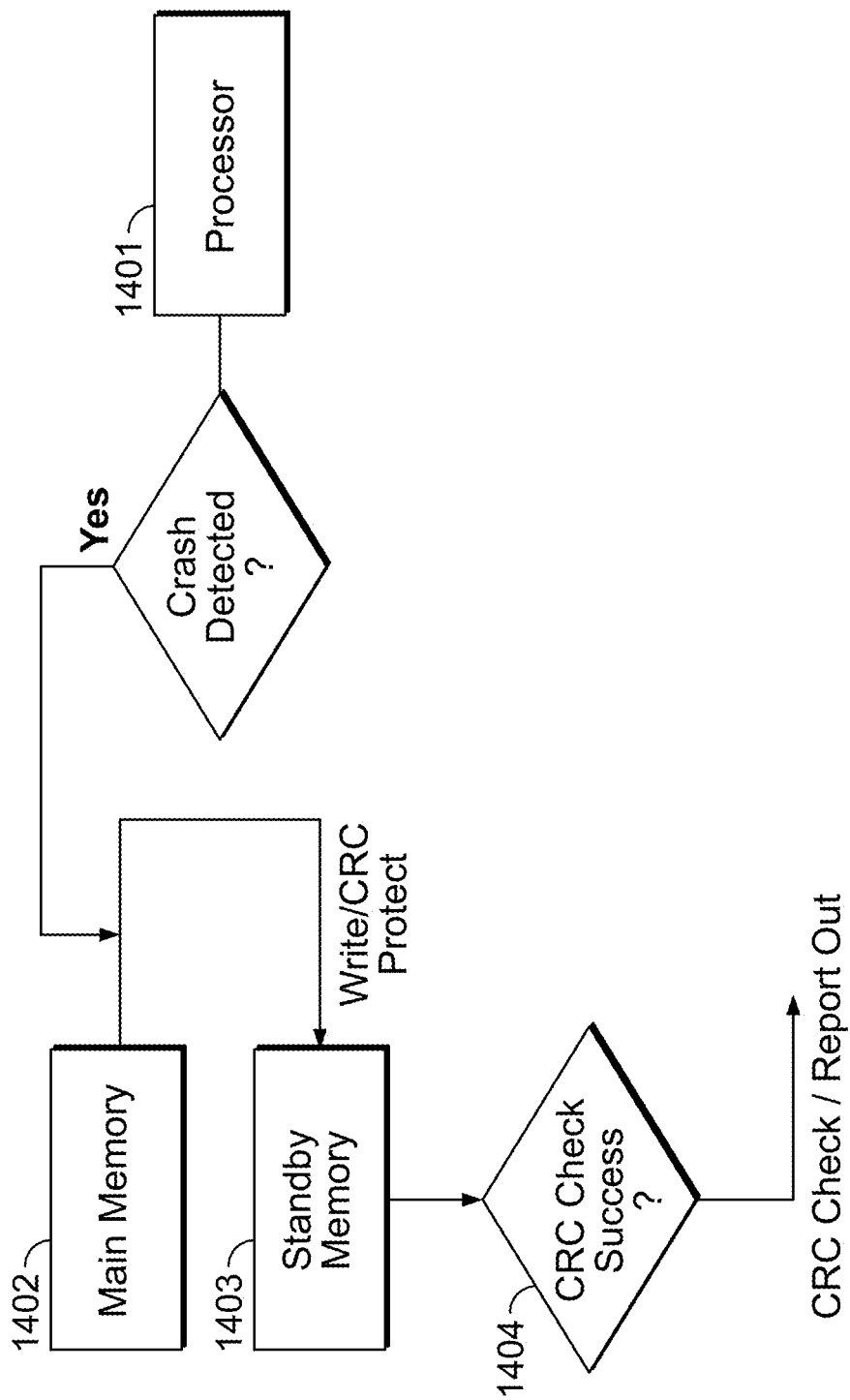
FIG. 14 shows an exemplary system for facilitating crash recovery in accordance with some embodiments of the present disclosure.

FIG. 14 depicts an exemplary system for facilitating crash recovery (e.g. crash of the ECU) by a system of a vehicle (e.g., as shown in FIG. 1). For example, the systems may handle a situation when an ECU locks up and becomes non-responsive, as a result the system may prevent data from becoming lost after the non-recoverable trap or another module resets an entire core (e.g., as shown in FIG. 3). In these situations the system avoids a hard power cycle but rather suffers a "soft" or "warm" crash. As a result, volatile memory contents can be retained.

As shown in FIG. 14, the exemplary system of the vehicle may include a core with a processor 1401, regular Random-Access Memory (RAM) memory 1402 (labeled as "Main Memory" in FIG. 14), and dedicated standby RAM memory 1403 (labeled as "Standby Memory" in FIG. 14). In some embodiments, the standby RAM memory may be a part of the regular RAM memory. In some embodiments, the standby RAM memory may be dedicated circuitry. The Operating System (OS) of the vehicle may include instructions dedicated to a low level failure (e.g., low level ECU failure), bad code or memory protection failure, or a watchdog trigger event. The processor may take a snapshot of system information and save it in the standby RAM memory. For this purpose, the system may reserve a portion of RAM in a linker structure which will not be cleared between boots.

In some embodiments, the processor may protect the data by computing Cyclic Redundancy Check (CRC) codes 1404 for blocks of the snapshot taken after the crash and stored in the standby RAM 1403. In this way, after a reboot, a CRC check 1404 can be performed to check if the data is valid. The data may then be reported out via Controller Area Network (CAN) bus or Unified Diagnostic Services (UDS) protocol. The system may also set a "fresh" flag in the standby memory to indicate presence of new data. The crash data in the standby RAM may later be copied to non-volatile memory and/or to an external system (e.g., another core or a microcontroller).

In some embodiments, non-volatile memory (NVM) may be used to store a snapshot. In this way, the buffer containing crash information is not erased on a subsequent bootup, but is rather copied to non-volatile memory. For example, the core may include an emergency stack for performing extra functions in a locked-up state. During a crash, the system may set a pointer to the emergency stack and call new functions to take a snapshot. In some embodiments, stack overflow in the watchdog module may be redirected to a non-maskable interrupt handler.

In some embodiments, the snapshot may include a stack trace. For example, a system may access a 20-deep pre-allocated list of unsigned integers, each saving an address of jump back instruction. In some embodiments, the snapshot may include a software git hash. In some embodiments, the snapshot may include a trap identifier. In some embodiments, the snapshot may include a watchdog status. In some embodiments, the snapshot may include a free running system timer value. In some embodiments, the snapshot may include any data of interest (stack pointer, status registers, timestamp, etc.).

In some embodiments, the crash data snapshot may be dumped to the CAN bus through the heartbeat frame when the bootloader starts. The bootloader may then operate normally. In some embodiments the data dump may be recorded by a data logger attached to the bus (e.g., to the CAN bus).

In some embodiments, the snapshot may be a packed binary file that can be obtained via a service such as Unified Diagnostic Services (UDS) protocol using a UDs client. The binary file may include a header file with defined functions. A python tool may then be used to unpack the data into human or system readable format. In some embodiments, the system may take snapshots during normal operation (e.g., periodically or based on a system or user request) to provide added administration tools. In some embodiments, the snapshot data maybe collected from an entire fleet and used to predict failure in other vehicles, e.g., as described in FIG. 13.

Figure 14A:
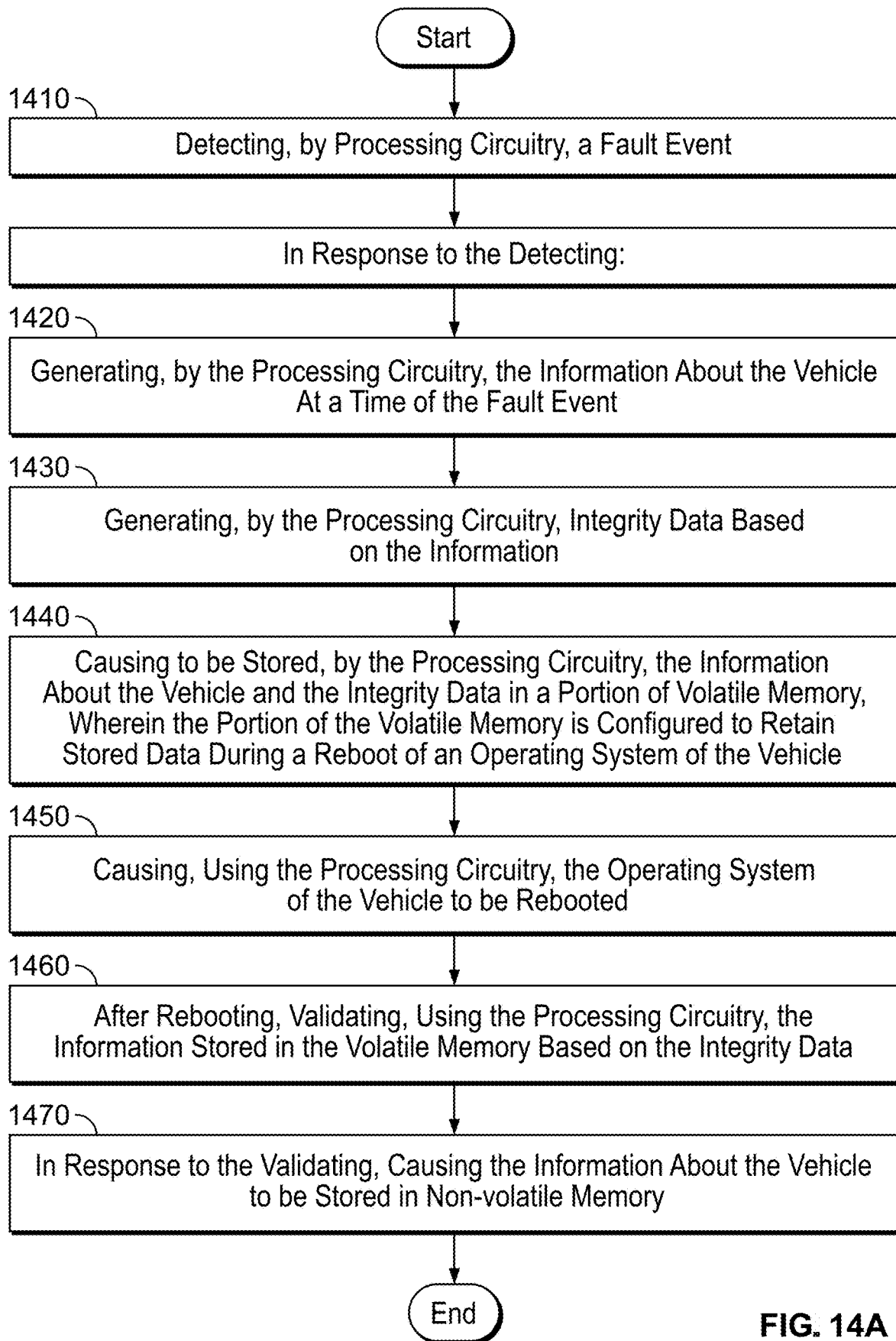
FIG. 14a shows a flow chart of illustrative steps for a method for storing information about a vehicle, in accordance with some embodiments of the present disclosure.

Some embodiments include a method for storing information about a vehicle, as in FIG. 14a, the method comprising detecting, by processing circuitry, a fault event 1410 and in response to the detecting generating, by the processing circuitry, the information about the vehicle at a time of the fault event 1420, generating, by the processing circuitry, integrity data based on the information 1430, causing to be stored, by the processing circuitry, the information about the vehicle and the integrity data in a portion of volatile memory, wherein the portion of the volatile memory is configured to retain stored data during a reboot of an operating system of the vehicle 1440, causing, using the processing circuitry, the operating system of the vehicle to be rebooted 1450, after rebooting, validating, using the processing circuitry, the information stored in the volatile memory based on the integrity data 1460, and in response to the validating, causing the information about the vehicle to be stored in non-volatile memory 1480. In some embodiments the integrity data comprises a cyclic redundancy check (CRC). In some embodiments the volatile memory comprises random access memory (RAM). In some embodiments the portion of volatile memory is a dedicated portion of the volatile memory reserved for the information and the integrity data. In some embodiments detecting the fault event comprises detecting a system crash. In some embodiments the information comprises a snapshot of a state of software in the vehicle. In some embodiments generating the information, generating the integrity data, and causing the information and the integrity data to be stored is performed by an emergency stack that is programmed to be executed in the event of the fault event.

Some embodiments include a system for storing information about a vehicle, the system comprising an operating system of a vehicle, a fault event, information about the vehicle at a time of the fault event, integrity data generated based on the information about the vehicle at a time of the fault event, a portion of volatile memory configured to retain stored data during a reboot of the operating system of the vehicle, wherein the information about the vehicle and the integrity data are stored in the portion of volatile memory in response to the fault event, non-volatile memory wherein in response to the operating system of the vehicle being rebooted, the information about the vehicle is validated based on the integrity data and wherein, in response to the validation, the information about the vehicle is stored in the non-volatile memory. In some embodiments the integrity data comprises a cyclic redundancy check (CRC). In some embodiments the volatile memory comprises random access memory (RAM). In some embodiments the portion of volatile memory is a dedicated portion of the volatile memory reserved for the information and the integrity data. In some embodiments detecting the fault event comprises detecting a system crash. In some embodiments the information comprises a snapshot of a state of software in the vehicle. Some embodiments include an emergency stack that is programmed to generate the information, generate the integrity data, and cause the information and the integrity data to be stored in the event of the fault event.

Some embodiments include a non-transitory computer-readable medium having non-transitory computer-readable instructions encoded thereon that, when executed by a processor, causes the processor to detect, by processing circuitry, a fault event, and in response to the detecting generate, by the processing circuitry, the information about the vehicle at a time of the fault event, generate, by the processing circuitry, integrity data based on the information, cause to be stored, by the processing circuitry, the information about the vehicle and the integrity data in a portion of volatile memory, wherein the portion of the volatile memory is configured to retain stored data during a reboot of an operating system of the vehicle, cause, using the processing circuitry, the operating system of the vehicle to be rebooted, after rebooting, validate, using the processing circuitry, the information stored in the volatile memory based on the integrity data, and in response to the validating, cause the information about the vehicle to be stored in non-volatile memory. In some embodiments the integrity data comprises a cyclic redundancy check (CRC). In some embodiments the volatile memory comprises random access memory (RAM). In some embodiments the portion of volatile memory is a dedicated portion of the volatile memory reserved for the information and the integrity data. In some embodiments to detect the fault event comprises detecting a system crash. In some embodiments the information comprises a snapshot of a state of software in the vehicle.

Figure 15:
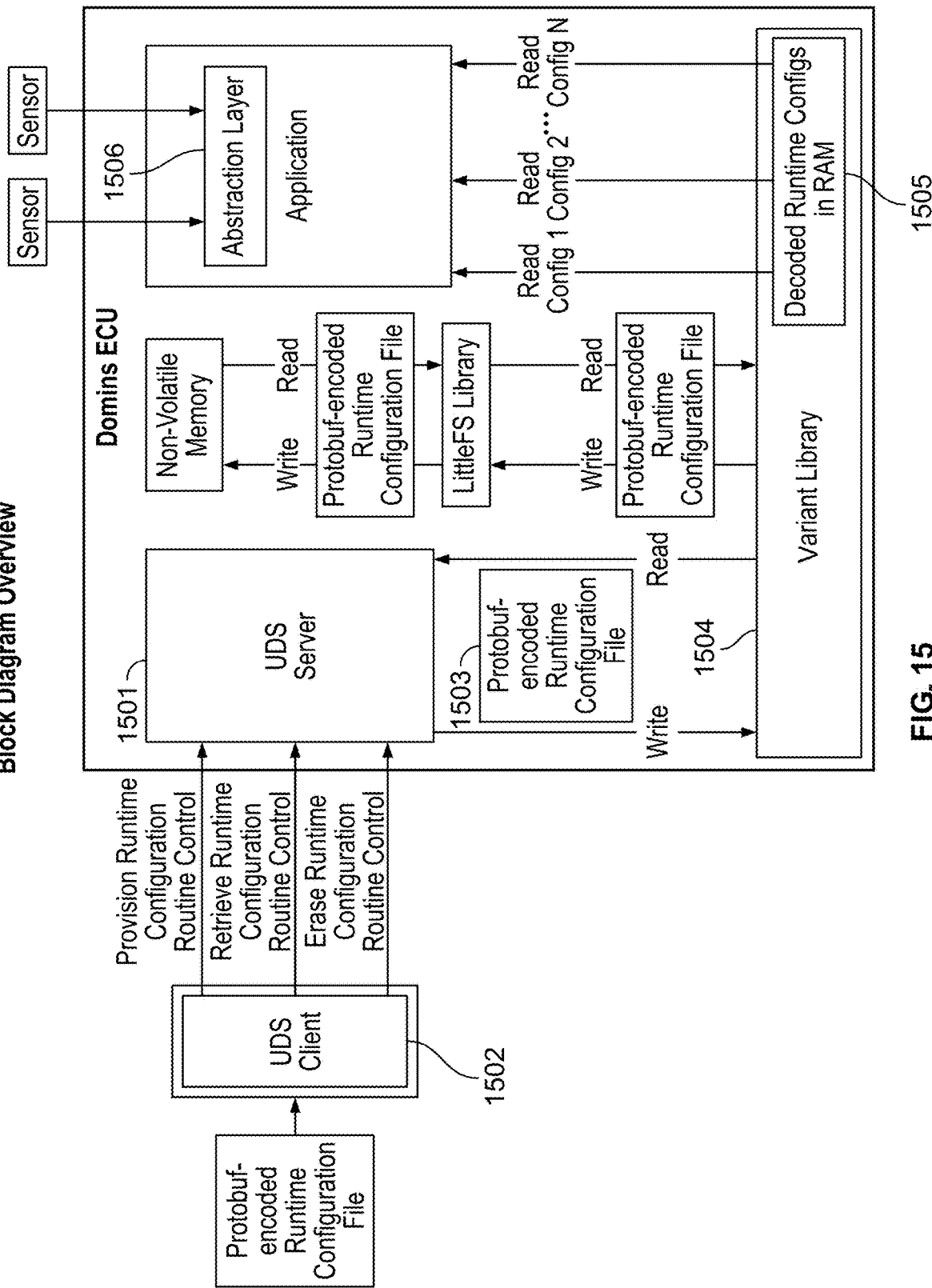
FIG. 15 shows an exemplary system for management of versions of database files for a micro-controller, such as a micro-controller of vehicles depicted in any of FIGS. 1-3 in accordance with some embodiments of the present disclosure.

FIG. 15 depicts an exemplary system for management of versions of database (DBC) files for a micro-controller (e.g., a micro-controller of vehicles depicted in any of FIGS. 1-3). DBC files may be definition files that comply with SAE J1939 standards. DBC files may also be in special formatted definition files as described in relation to FIGS. 4-8. The DBC files may be used to provide data over Controller Area Network (CAN) bus from peripheral devices (e.g., from a pump brake module, engine module such as ECM, or any other peripheral or sensor of a vehicle). DBC files will generally be in a form that must be interpreted. For example, data from DBC may appear in the format shown in Table 1:

TABLE 1

| 0 | 18FE6900 | X | 8 | 9C 27 DC 29 FF FF F3 23 | 49.745760 | R |

This data may be decoded to receive values for certain defined parameters. For example, DBC file received from a pump brake system may define depression angle value. In another example, the DBC file received from an engine system may define values that include, manifold temperature, revolution per minute of the motor, etc. The conversion from a binary DBC data to usable values may be performed by an interface file that accepts data over CAN or Ethernet bus.

In one approach a single interface file is dedicated to handling a certain DBC file from a certain peripheral (e.g., from pump brake module). However, if the pump brake hardware was to be physically modified with a different pump brake, this would necessitate complete replacements of the interface file to handle the new version of a peripheral. This approach fails to leverage commonalities between DBC files for different versions of a peripheral and thus fails to use common parts of an interface file that could still be used, requiring instead an entirely new interface file which can cause burdensome delays in acquiring and installing new interface files. Moreover, a change in the interface file may also require changes throughout the whole system that rely on data from the DBC file interpreter. Thus, a change in a single peripheral may require changes throughout the architecture of a vehicle (or another system).

To overcome the problems of the approaches described above, an implementation of vehicular architecture is provided that keeps application code the same across the board of the system while providing different interfaces depending on vehicle type, architecture of the vehicle, or based on replacement of a certain peripheral. For example, different interfaces may be required for different versions of a vehicle. In another example, a replacement of a peripheral may lead to the need for a new version of DBC interpreter interface. In one example, a vehicle may receive, e.g., a new pump brake hardware which requires a new interface file.

In some embodiments, the operating system of a vehicle may detect the presence of a new peripheral (e.g., new pump brake) by detecting a build configuration event. Then, the operating system may pull in a new interface file to flash into hardware of the vehicle. For example, the operating system may identify an association between source files and a vehicle software component (e.g., an association between data from a new pump brake and applications which handle the pump brake input and/or any application that operates using data from the pump brake). The operating system may then combine the associated source files in a root directory and generate at least one interface abstraction layer for the vehicle software component (e.g., ECU which may need the pump brake data) based on the combined source files.

For example, the pump brake module may provide a DBC file that provides an angle of depression for the brake pedal. However, since different brakes have different "give," the same angle change in the brake depression value may be handled completely differently by other parts of the vehicle (e.g., the ECU or TCM). To solve the problem, the system may provide an abstraction layer 1506 between the DBC interpretation by an associated interface and applications executing for other modules in the system. For example, the abstraction layer may provide an "intended speed change" value into the system instead of a raw angle value. For example, for one type of pump brake, a change in 5 degrees indicates a desired decrease of 5 MPH, and for another type of pump brake change in 5 degrees indicated a desired decrease of 7 MPH. If all software related to brake actions are programmed to rely on the desired speed change metric, an abstraction layer can be provided that converts DBC data from the pump brake into a desired speed change metric before providing that data to other applications. In this way, an interface version for the pump brake may be easily changed without any other changes to the rest of the system. Similar abstractions may be used for any other value or values provided by the DBC files. The abstracted information may therefore be processed without regard to the data generated by the new hardware component.

The update of the interface version may be performed by a system depicted in FIG. 15. For example, the vehicle may include a Unified Diagnostic Services (UDS) server 1501 that allows outside devices to perform UDS operations (e.g., provisioning run-time control, retrieving runtime control, and erasing runtime control). These operations may be CRC protected. The UDS server makes it possible to connect a computer 1502, known as UDS client, (e.g., computer or a dedicated tester tool) to the vehicle (e.g., via UDS interface). The UDS client 1502 may be provisioned (e.g., via an external network such as the Internet) with encoded runtime configuration file for the vehicle. The encoded runtime configuration file 1503 may be sent to the UDS server 1501 which then may write it to the variant library 1504 in the memory of the vehicle. The vehicle may use non-volatile memory, and optionally one or more additional libraries such as Power-loss resilience application to decode the runtime configuration file 1503. As a result, an additional decoded runtime configuration 1505 may be added to the variant library storage. The application (e.g., ECM applications) may then request the needed configuration from the library during the runtime. Optionally, there may be an abstraction layer available to the application that may access abstracted data instead of raw values from DBC files.

In some embodiments, instead of discrete versions, the variant library may, instead define what is different in different versions of the runtime instructions. For example, certain parts of the code may be obfuscated in the code to achieve different versions. In some implementations, the build system may access vehicle generation information and use that information to identify hardware differences. For example, a different interface ID for a battery or HVAC may be accessed. Instead, if using a configuration specific to a certain vehicle model, the system may identify which parts of the vehicle are different. For example, if two vehicles have a different HVAC system, the software module for controlling the HVAC may be switched in the configuration without affecting the rest of configuration (this may be enabled by the use of abstraction). A new local Interconnect Network (LIN) table may be used to accomplish this functionality. In another embodiment, the schedule table may be used to make the switch to at run time. For example, the same binary may be loaded to all vehicles, and the system may select correct code on the fly and ignore the code relevant to other configurations.

In some embodiments, build-time configuration options may be replaced with runtime configuration options. For example, in this way only a single binary may be used for all vehicle variants. All other configuration options can be set by this variant library. User-configurable or selectable variant options of a vehicle may also be stored using the variant library. As another example, a selectable variant may be defined by the wheel size on the vehicle. Since wheel size has an impact on vehicle dynamics, wheel size has a pre-defined impact on the Vehicle Dynamics Module software, all software may be affected. The wheel size may be abstracted in software and provided to all modules that rely on wheel size to perform their functions.

In some embodiments, similar techniques may be used for CAN interface handling. For example, a configuration file may denote a software or hardware difference. Depending on a string value denoting the differences, the build system may select correct DBC files from the directories in memory.

In some embodiments, runtime software variants may be handled in each module (e.g., in an ECU) at runtime based on the configuration set in the vehicle. When the configuration in a vehicle is changed the module software will operate differently based on the new configuration even though the software remains the same on the module. Runtime software variants may be tracked in the ECU source code by using "if/then" or "switch" statements (e.g., in C programming language). Build-time software variants may be generated by the software build system using compile-time flags. Multiple binaries may be made for the same module to support different vehicle configurations. In order to change the software operation on a vehicle, the module (e.g., the ECU) may be flashed with different software after the configuration in the vehicle is changed. Build-time variants may be tracked and controlled by the variant configuration map. The variant configuration map may be stored in the memory of the vehicle (e.g., in a software GitHub repository) as part of the build scripts. During a software build the generated binaries are structured according to their variants within the vehicle software package which is then uploaded and stored in the variant library.

In some embodiments, vehicle generation IDs may be defined as a revision of a specific platform. To handle the variants, multiple DBC files may be combined based on those IDs defined in the project's build configuration. DBC files may be broken apart by platform and then combined into one DBC file per bus and placed in the storage prior to build time based on fields defined in the build configuration. The operating system may generate the interface abstraction files based on interface variants. In this way, a folder of common interfaces and vehicle model specific commonalities may be generated that are defined to handle DBC files from multiple peripherals. For example, a folder for common DBC interfaces may exist as well variant folder for interfaces for models which use different versions of hardware. As commonalities decrease between platforms, the folder structure may end up changing into a format that no longer uses the common folder.

Figure 15A:
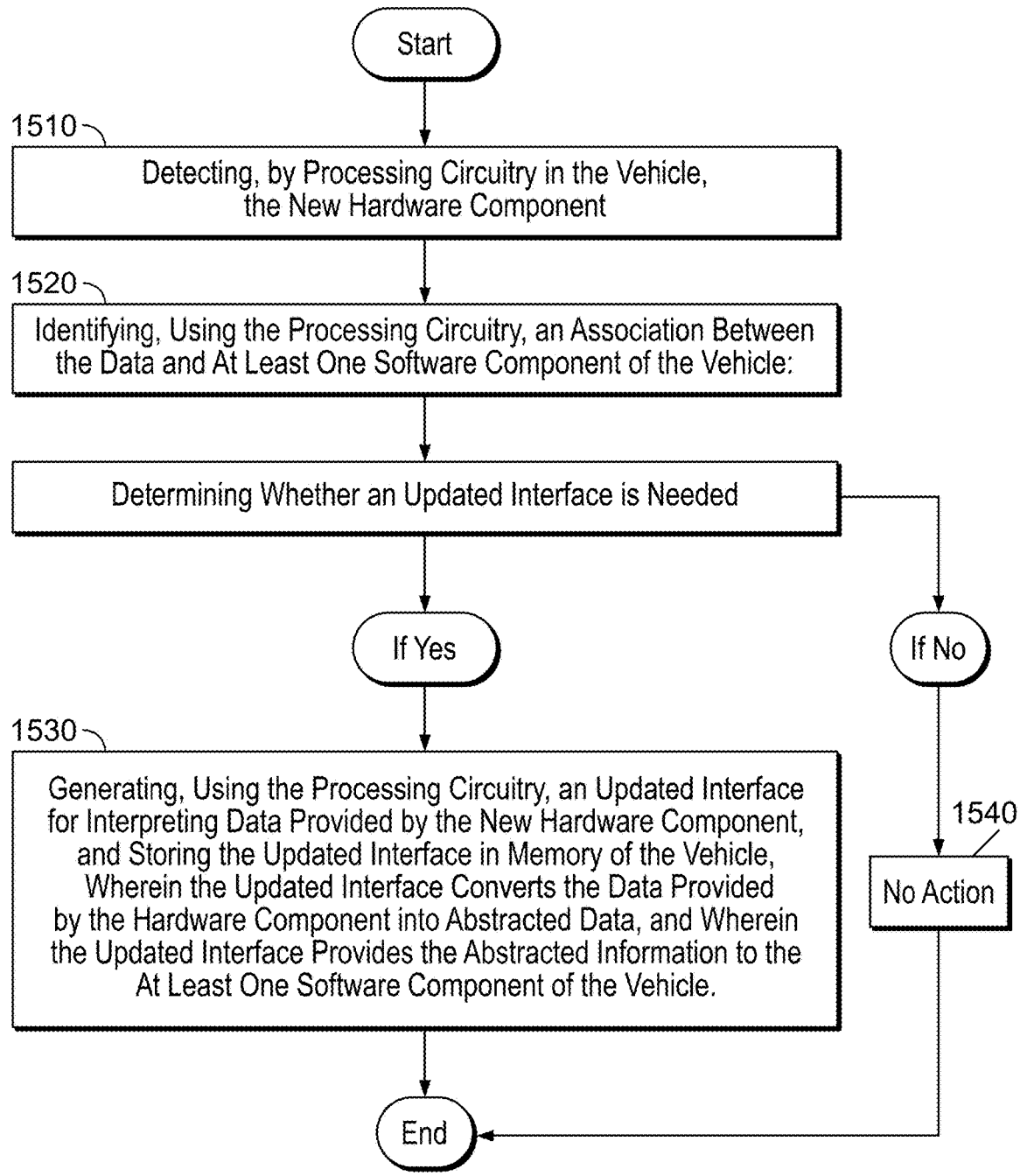
FIG. 15a shows a flow chart of illustrative steps for a method for updating a vehicle when a new hardware component is installed, in accordance with some embodiments of the present disclosure.

Some embodiments include a method for updating a vehicle when a new hardware component is installed as in FIG. 15a, the method comprising detecting, using processing circuitry in the vehicle, the new hardware component in step 1510, identifying, using the processing circuitry, an association between data generated by the new hardware component and at least one software component of the vehicle 1520, determining whether an updated interface is needed in step 1530, and if so, then in step 1540, generating, using the processing circuitry, an updated interface for interpreting the data from the hardware component, wherein the updated interface converts the data provided by the hardware component into abstracted information, and wherein the updated interface provides the abstracted information to the at least one software component of the vehicle. In no updated interface is needed in step 1520, then the method moves to step 1540 and no action is taken. In some embodiments the data generated by the new hardware component comprises a database (DBC) file. Some embodiments include storing the updated interface in a library of interfaces, wherein generating the updated interface comprises accessing the updated interface from the library. In some embodiments the updated interface is selected from the library based on an identification of the new hardware component. Some embodiments include processing, by the at least one software component of the vehicle, the abstracted information without regard to the data generated by the new hardware component. In some embodiments the updated interface is used for bidirectional communication between the at least one software component and the new hardware component. In some embodiments generating the updated interface comprises modifying an existing interface.

Some embodiments include a system for updating a vehicle when a new hardware component is installed, the system comprising the new hardware component, an association between data generated by the new hardware component and at least one software component of the vehicle, and an interface configured to convert the data from the hardware component into abstracted information, wherein the interface provides the abstracted information to the at least one software component of the vehicle. In some embodiments the data generated by the new hardware component comprises a database (DBC) file. Some embodiments include a library of interfaces wherein the updated interface is stored. Some embodiments include an identification of the new hardware component wherein the updated interface is selected from the library based the identification of the new hardware component. In some embodiments the abstracted information is processed by the at least one software component of the vehicle without regard to the data generated by the new hardware component. In some embodiments the updated interface is used for bidirectional communication between the at least one software component and the new hardware component. In some embodiments the updated interface is a modification of an existing interface.

Some embodiments include a non-transitory computer-readable medium having non-transitory computer-readable instructions encoded thereon that, when executed by a processor, causes the processor to detect, using processing circuitry in the vehicle, the new hardware component identify, using the processing circuitry, an association between data generated by the new hardware component and at least one software component of the vehicle and generate, using the processing circuitry, an updated interface for interpreting the data from the hardware component, wherein the updated interface converts the data provided by the hardware component into abstracted information, and wherein the updated interface provides the abstracted information to the at least one software component of the vehicle. In some embodiments the data generated by the new hardware component comprises a database (DBC) file. Some embodiments include to cause the processor to store the updated interface in a library of interfaces, wherein to generate the updated interface comprises accessing the updated interface from the library. In some embodiments the updated interface is selected from the library based on an identification of the new hardware component. Some embodiments include causing the processor to process, by the at least one software component of the vehicle, the abstracted information without regard to the data generated by the new hardware component. In some embodiments the updated interface is used for bidirectional communication between the at least one software component and the new hardware component.

Figure 16:
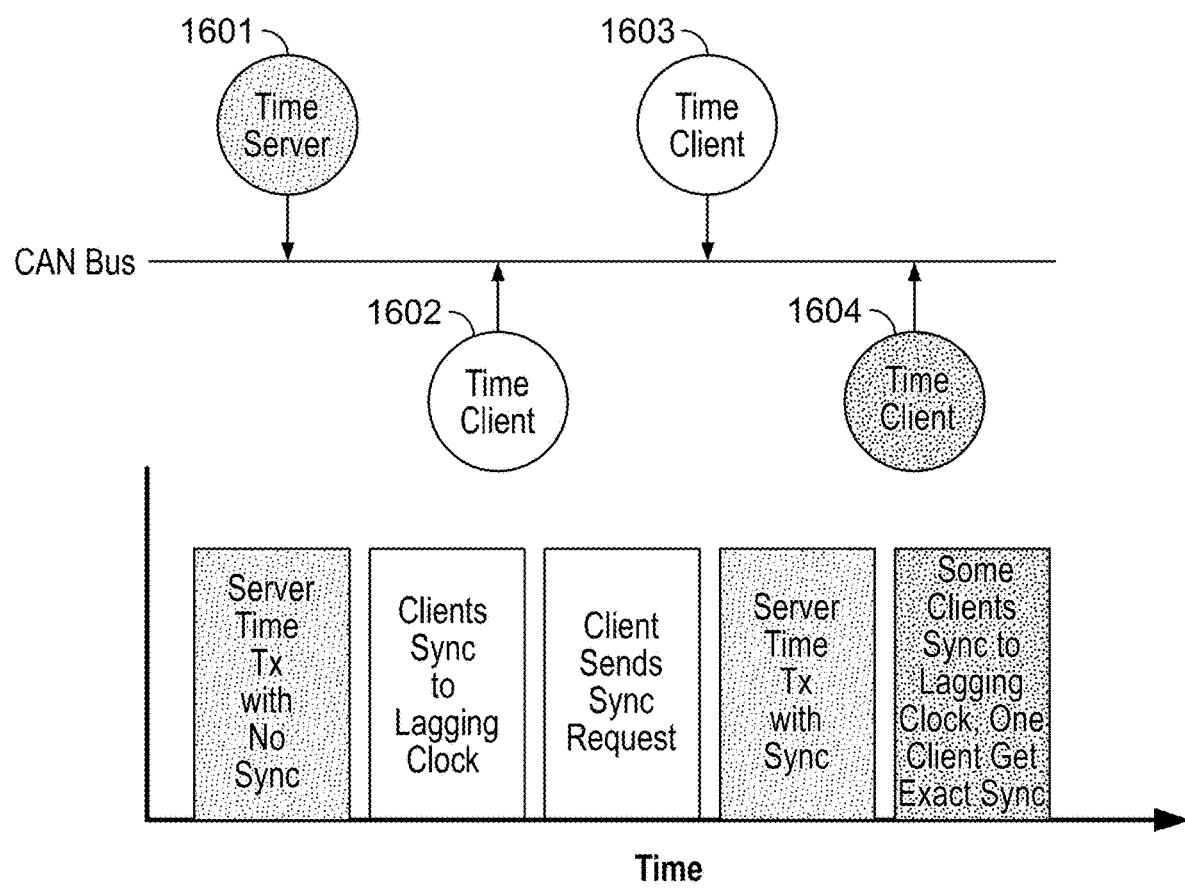
FIG. 16 shows an exemplary system for managing synchronization of time of different modules connected via a single bus in accordance with some embodiments of the present disclosure.

FIG. 16 depicts an exemplary system for managing synchronization of time of different modules (e.g., hardware and/or software) connected via a single bus (e.g., a CAN bus). In particular, the techniques may be applied to any kind of a many-master bus-based protocol (e.g., when there are many bus master nodes present on the bus). Such busses may be used when multiple nodes on the bus must have an ability to initiate transfer of data. For example, a many-master bus may be used to transfer data between peripherals and memory without the use of CPU.

In an exemplary vehicle (e.g., as depicted in FIGS. 1-3), multiple nodes (e.g., ECUs) may be connected to a bus 1600 (e.g., a CAN bus or any other many-master bus) as shown, in FIG. 16. Each circle in FIG. 16 may represent a node 1601, 1602, and so on. Often, individual nodes (e.g., ECUs) may need to know a measure of time, which is consistent across the bus. In one approach, a single node may be nominated (e.g., at random) as the "time server." This time server node may then broadcast its internal clock on the bus. All other nodes would then receive this broadcast message and synchronize their internal clocks to this.

However, this prior solution does not consider the time delay between the point at which the time is set on a bus message by the time server, and the time it is finally received and processed by a receiving node. The delay may be caused by several variable sources of delay. The sources of delay may include the time it takes for the time synch broadcast to go through the server's software stack before it can be transmitted over a hardware bus. The sources of delay may include the time the message spends travelling on the wire of the bus (which may be non-deterministic in bus managements systems that use arbitration protocols). The sources of delay may include the time it takes to process the received message by the client's software stack before the client can access the time value. For these reasons, when the client updates its internal clock to the time it just received in the bus message, it is synchronizing to a time in the past. In this approach the internal clock of a client will be lagging the time of the time server node. Some nodes may not care about such a relatively small time difference (e.g., nodes 1602 and 1603), however other nodes may want precise and tight time synchronization (e.g., a node 1604) with the server nodes (1601).

Another approach to time synchronization is described by Simple Network Time Protocol (SNTP) protocol, RFC 1769, https://datatracker.ietforg/doc/html/rfc1769 which is incorporated herein in its entirety. In such approach, a client sends its local time in a synchronization message to the time server. The server replies with a synchronization message that includes both client's local time as well as the server's local time. The client may then compute the delay (e.g., by subtracting time stamps) between the client and the server and adjust its clock by the delay value achieving tighter synchronization. The downside of this approach is that it requires point to point communication between each node and the time server. Large amounts of such messages may saturate the bus and degrade bus performance. In addition, some nodes may not need tight synchronization in which case they will still flood the bus with totally unneeded synchronization messages.

Figure 17:
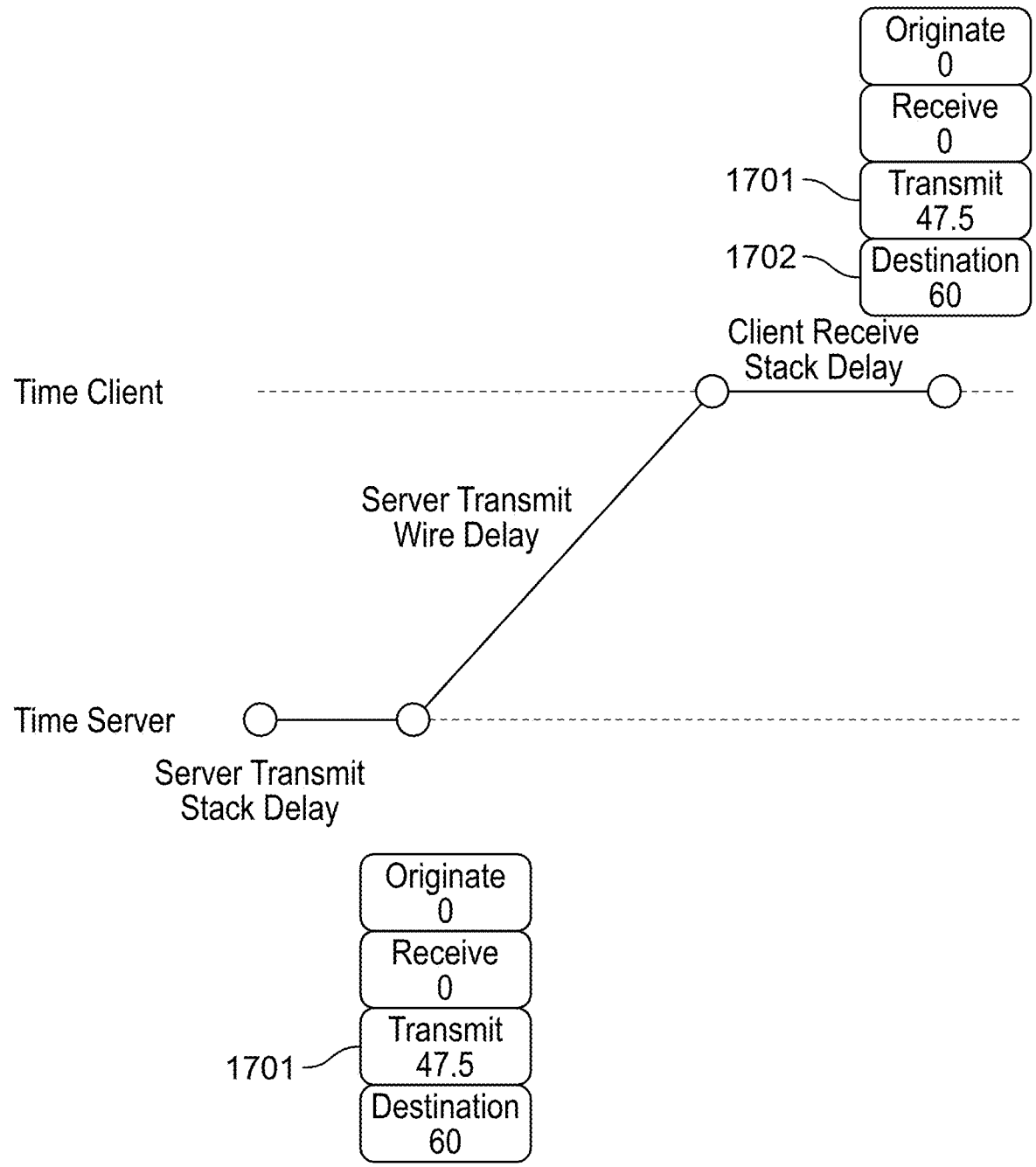
FIG. 17 shows an interaction between a node that needs a tight synchronization and the server in accordance with some embodiments of the present disclosure.
Figure 18:
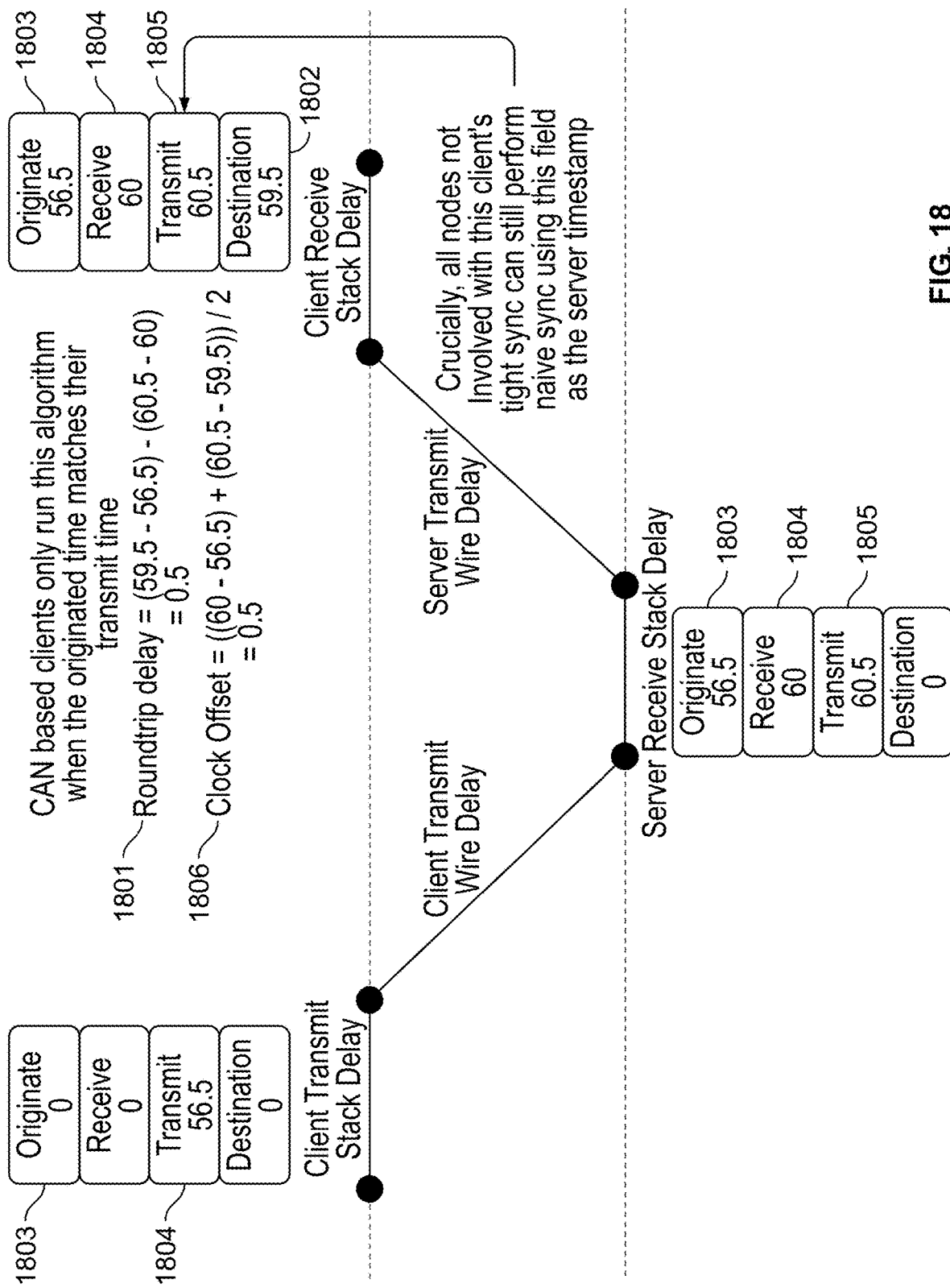
FIG. 18 shows an exemplary interaction illustrating roundup trip delay in accordance with some embodiments of the present disclosure.

FIGS. 17 and 18 show a hybrid solution to node synchronization that can accomplish both loose and tight synchronization as required by multiple nodes with different needs on the same bus. This method provides the ability of the node to choose its level of time synchronization. By passively listening to time updates it can maintain a sub-par level of synchronization. By actively requesting time updates it can maintain a high level of synchronization without affecting the other nodes on the network. As shown in FIG. 17, the server node may continuously (e.g., periodically or at other specific intervals) transmit (e.g., by broadcasting on a bus) a message that includes the server's internal time. For example, the message may include a "Transmit" field that includes a time value of the server's internal clock when the message is created. For example, the transmit timestamp may have value of "47.5 ms"

The message may experience server stack delay, wire delay, and client stack delay before being processed by a time client node which may modify the message by adding a destination timestamp at the time of receipt of the message. For example, the destination timestamp may have a value of "60 ms." The node may then compute the difference between the transmit and destination timestamps to adjust its clock. For example, the node may adjust its clock to "47.5 ms" to achieve loose synchronization. The client node may perform this synchronization whenever it is suitable (e.g., every time the synch message from the server is received or using only some of the broadcast messages).

FIG. 17, shows an interaction between a node that needs a tight synchronization and the same server. In this case, the server may also continuously (e.g., periodically or at other specific intervals) transmit (e.g., by broadcasting on a bus) a message that includes the server's internal time. However, the server may account for synchronization requests sent by nodes via a bus.

In FIG. 17 for example, a node that needs a tight synchronization may transmit a synch request which includes a timestamp 1701 at the time of transmittal using the node's internal clock. For example, the transmit field may include a value of "56.5" (which is the node's local time). The node may save a local copy of the transmit field for verification.

When the time server receives such a request, it may modify its next periodically sent time update message. In some embodiments, the server may receive several tight synch requests before the next update message. In this case the server may process only one of these requests (e.g., the first one, or one selected at random). In particular, the server may create the next synch update message by placing the transmit value of the received messages into an "originate" field. For example, the "originate" field may include a value of "56.5." The server may also include a timestamp 1702 indicating when the message sent by the node was received by the server using the server's clock. For example, the "receive" file may have the value of "60." The server will then send the update message (e.g., at the originally schedule time or immediately) wherein the update message will include the time of transmittal based on the server's clock. For example, the transmit value may be set to "60.5."

When the client receives the synch message it may modify it by adding a timestamp into the destination field based on its own clock. When the client receives the synch message from the server that has a non-zero "originate" value, the client may compare the "originate" field to the initial "transmit" time of the message sent by the node (and stored in the node's memory). If the fields do not match, the node may still use the received message from the server for loose synchronization (e.g., as described with respect to FIG. 16). If the fields do match, the client may perform a tight synchronization.

In particular, the tight synchronization may be performed by computing a roundtrip delay 1801 e.g., where the roundtrip delay=("Destination" value 1802–"Originate" value 1803)— ("receive" value 1804–"transmit" value 1805), as shown in FIG. 18. That is, the client node may compute the delay between the server receipt and the server transmission, the delay between node transmission and the node receipt and subtract these values. The node may also compute the clock offset 1806 by averaging: (a) a time difference between the "originate" value 1803 (node clock) and receive time 1804 (server clock), and (b) a time difference between "transit value" 1805 (server clock) and "destination" 1802 (node clock). The roundtrip delay and offset values may be used by the node to modify its local clock to tightly match the server clock (e.g., by adding the roundtrip delay and clock offset to its internal clock). Advantageously, if two nodes are synched to each other they can perform a tight server synch using the same message from the server (because their transmittal values will be the same).

Additionally, in some implementations a node may store a history of computed clock offsets and roundtrip delays. If the history indicates a stable pattern, the node may reduce the frequency at which it requests tight synchronization or stops sending request for tight synchronization and rely on historical values instead to perform synchronization. This may further reduce congestion on a bus (e.g., on the CAN bus).

Figure 18A:
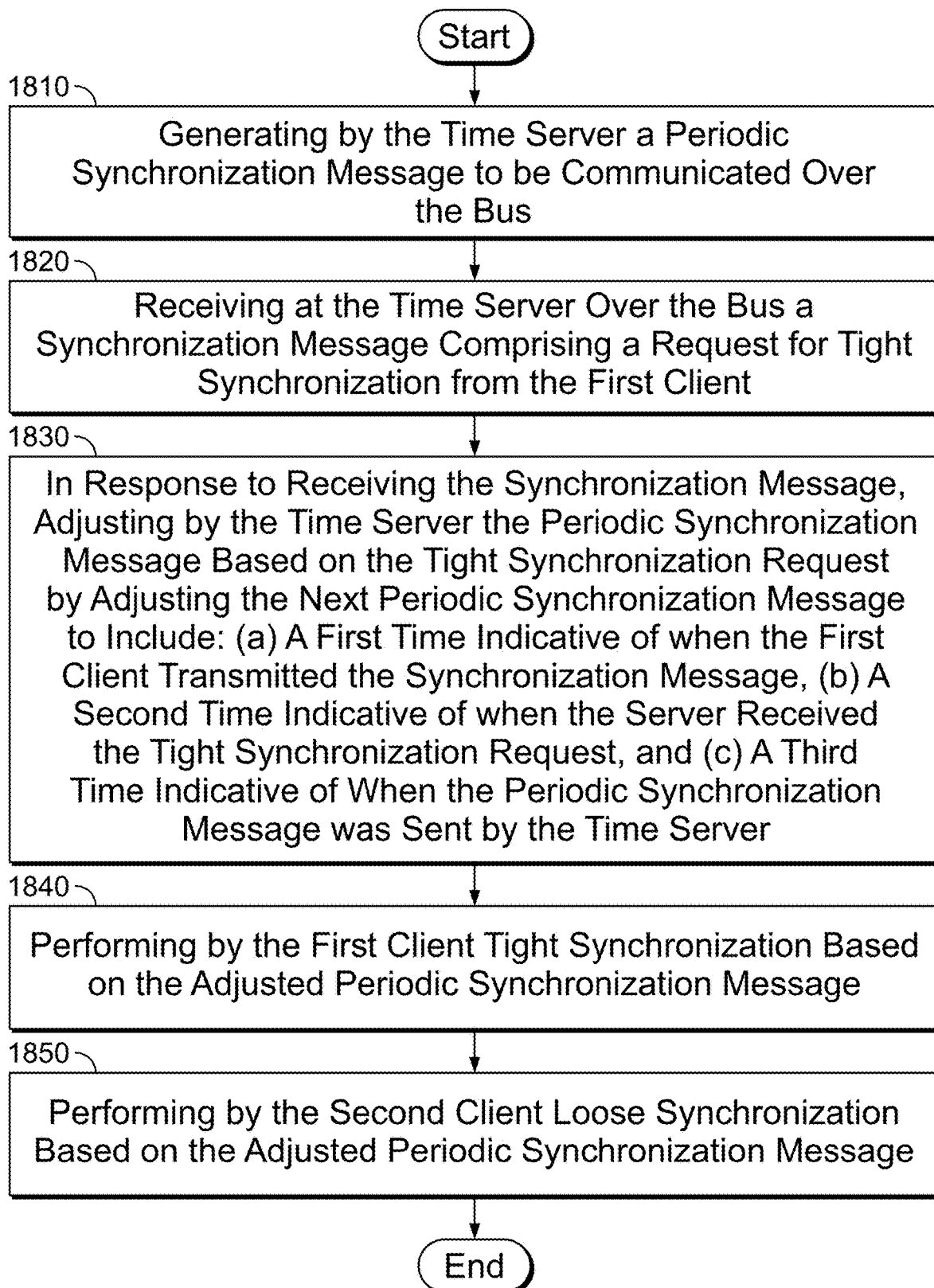
FIG. 18a shows a flow chart of illustrative steps for a method for tight synchronization between a first client, a second client, and a time server in accordance with some embodiments of the present disclosure.

Some embodiments such as that seen in FIG. 18A include a method for tight synchronization between a first client, a second client, and a time server, each associated with a respective local clock and each connected to a bus, the method comprising the steps of: generating by the time server a periodic synchronization message to be communicated over the bus 1810, receiving at the time server over the bus a synchronization message comprising a request for tight synchronization from the first client 1820, in response to receiving the synchronization message, adjusting by the time server the periodic synchronization message based on the tight synchronization request by adjusting the next periodic synchronization message to include: (a) a first time indicative of when the first client transmitted the synchronization message, (b) a second time indicative of when the server received the tight synchronization request, and (c) a third time indicative of when the periodic synchronization message was sent by the time server 1830, performing by the first client tight synchronization based on the adjusted periodic synchronization message 1840, and performing by the second client loose synchronization based on the adjusted periodic synchronization message 1850.

Figure 19:
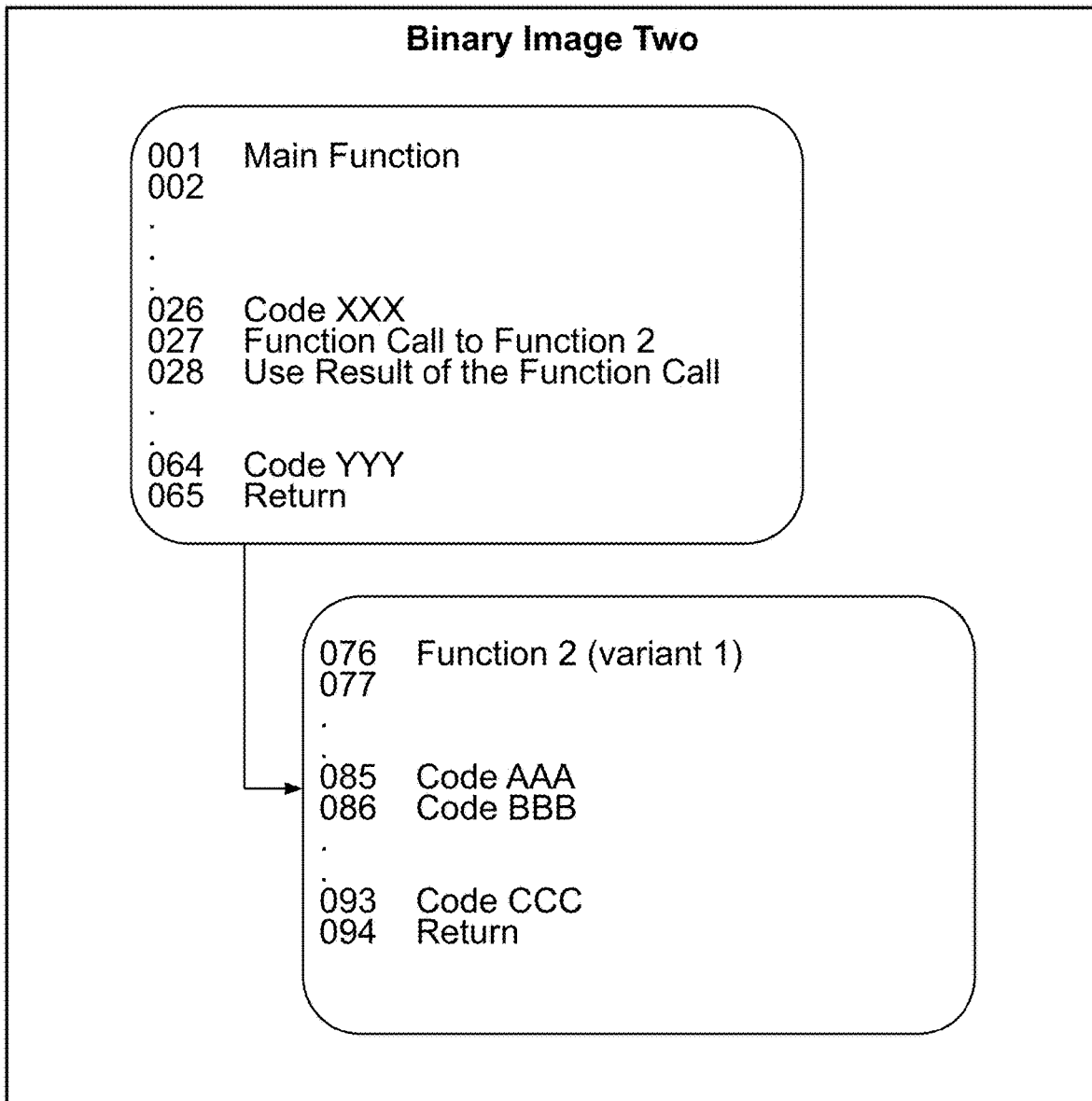
FIG. 19 shows exemplary code for a Second Unit that is used to test a First Unit in accordance with some embodiments of the present disclosure.
Figure 20:
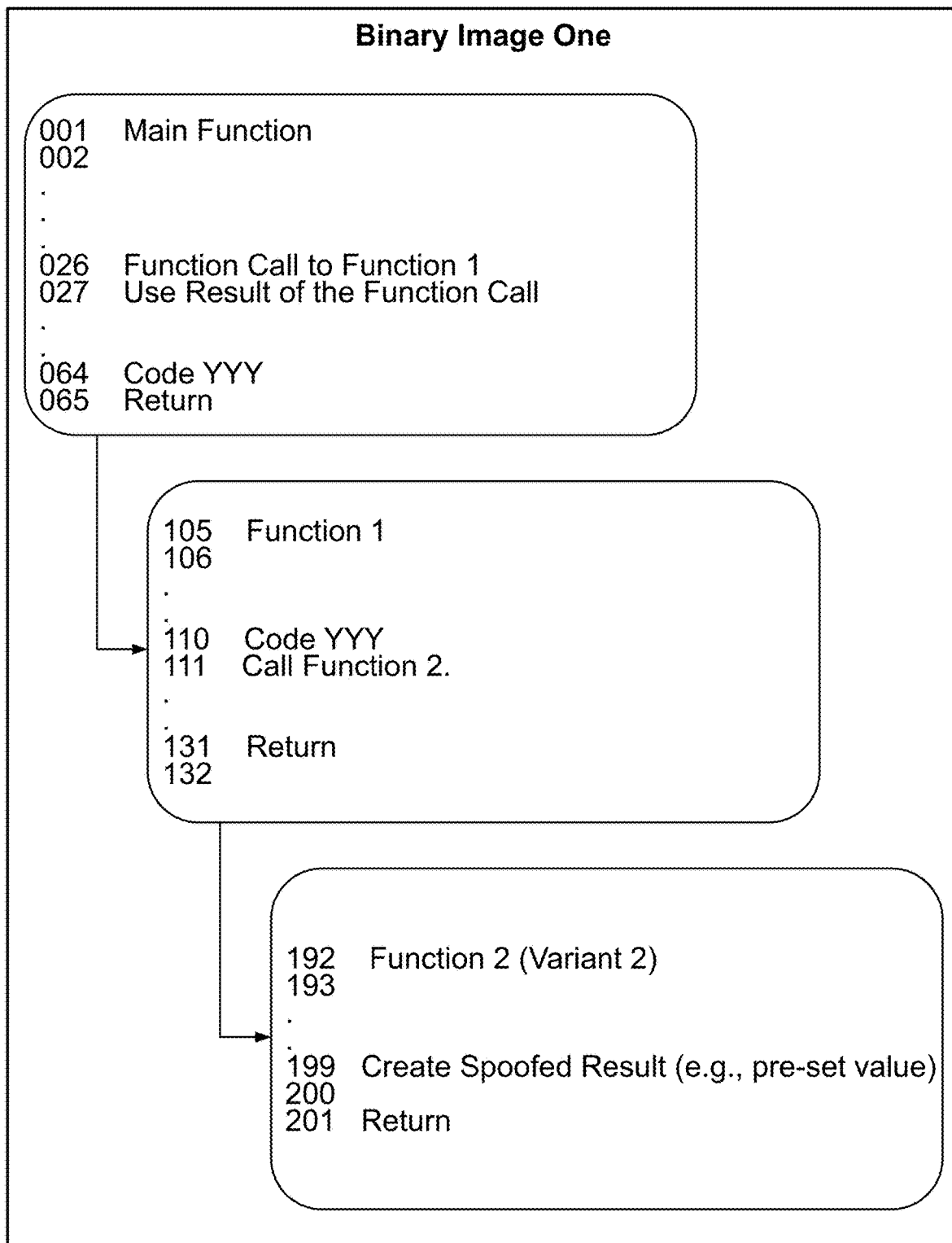
FIG. 20 shows exemplary code for a First Unit that is used that is being tested in accordance with some embodiments of the present disclosure.
Figure 21:
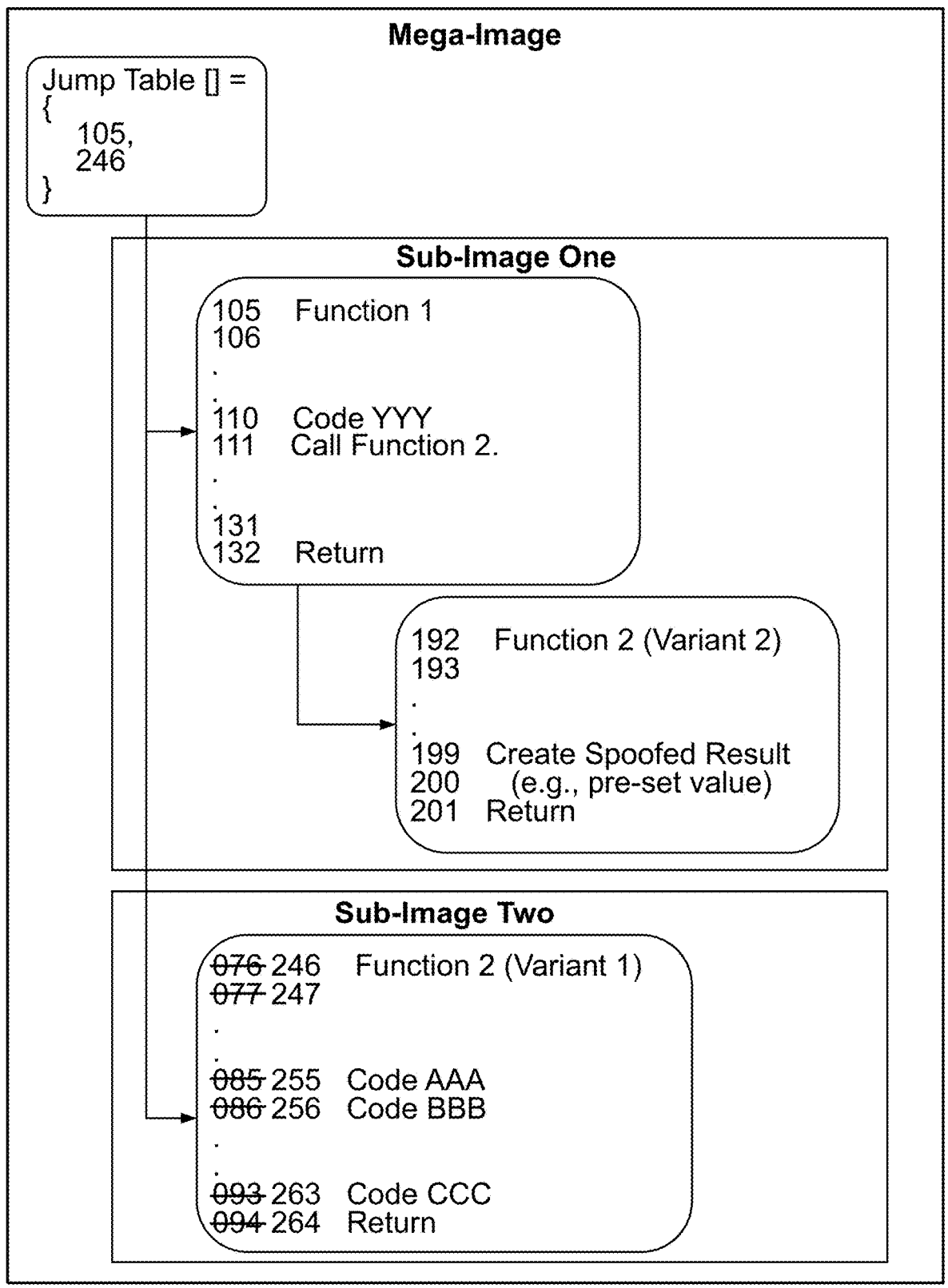
FIG. 21 shows an exemplary result of creating a super image of the code of FIG. 19 and FIG. 20 in accordance with some embodiments of the present disclosure

FIGS. 19-21 depict an example for stitching together assembly code for testing devices (e.g., integrated circuits). In particular systems and methods are provided to create compiled machine-readable code (e.g., assembly code) for testing multiple version of functions that are compiled from a language that does not allow function overloading operations (e.g., C language). The device may be any circuitry of a vehicle as shown in FIGS. 1-3. In some embodiments, the device may be any suitable electronic device.

Unit testing is an integral part to safe software development. For example, the ISO26262 standard highly recommends that safety critical software have unit testing on the target device or circuitry for which the code is intended to be run. To that end, during testing, software is provided to the device to be compiled and/or loaded on the existing hardware. Such testing ensures that any compiler or hardware specific features are properly accounted for in the device test.

In some implementations, a circuitry that is to be tested (e.g., an embedded circuitry of the vehicle) may receive and install the entire application as a single complied binary code in assembly language. For example, for all applications, drivers, and necessary libraries may be compiled into a single image, within a single memory space of the circuitry. However, such a requirement makes it difficult to perform exhaustive testing of all inputs for certain functions.

In one example, a first function on a first device may require an output of a second function produced by a second device. In this case to exhaustively test operation of the first function on the first device, it would be beneficial to test every possible output that can be provided by the second function produced by a second device. To accomplish this the second device may be flashed with code where the second function is replaced with a fake (also known as stubbed or mocked) function that simply provided a value set by the programmed or runs through every possible output instead of providing real functionality. For example, a TCM may have a function that requires a Revolutions Per Minitel (RPM) value from an ECM. In this case, when testing the TCM software, it may be beneficial to spoof an RPM provision function on the ECM that iterates through every possible RPM value. However, this means that the ECM that was used to test the TCM would eventually have to be-re-flashed with images for testing other functions or a real image that includes a real function that returns a real RPM value. Such a process of creating and re-flashing multiple binary images may be burdensome and may lead to errors if a wrong image is used.

In one approach function overloading may be used. In this case multiple versions of a function can exist, and the system may differentiate which function is called (e.g., based on inputs of the function call). However, multiple embedded systems do not accept code compiled from such languages and may accept code from languages that do not support overloading (e.g., C programming language).

When such languages are used, for any given image, only one copy of a function may exist. This means that if a function needs to be stubbed out for a fake test function to test another function, then that stubbed function is the only copy in the entire image. If, for example, the next unit under test was the stubbed-out function, it cannot co-exist in the same image as the previous one. In practice, this means multiple images must be compiled for the different units under test. The process of flashing these multiple images onto the target hardware and collecting the results is onerous.

To overcome this problem a method is provided that compiles all the needed images (included the real images, and all images with stubbed out functions) separately into assembly code. Then, the assembly code is stitched together into a single super-image. During the stitching adjustments to each sub-image are made to accommodate for the fact that they are now located at a different address space. This allows for flashing a single file that can be used for all testing and in production.

This solution requires no additional technology on top of the language with no function overloading (e.g., C programming language) and places no constraints of the target hardware. For example, the solution does not necessitate the use of a memory management unit, a new operating system, or a different programming language. The solution is broadly applicable to all types of suitable hardware and can greatly increase the efficiency of on-target unit testing. Moreover, the solution promotes isolation between unit tests, which is a central tenant of proper unit testing, and was hereto difficult to achieve using the languages with no function overloading.

The methods for creating the super images based on the compiled images may be performed using the following steps. Each unit test code that requires the use of stubbed out functions is compiled as a single image. Then, as many different images as is necessary to the final test suite are compiled. All compiled images are fed into a mega-image creation program (MICP). MICP, for each image, locates the position of that image in memory such that it does not conflict with memory requirements of other images. Then the MICP, for every image, adjusts the machine instructions within to reflect the new final address location. Next the MICP, as part of the final mega-image creation, creates a table of entry points into each sub-image withing the mega image that is the combination of all the sub-images, as well as the unit test framework.

Next, the mega image is flashed onto the target hardware. At this point hardware test may be run to collect test data. The ability to quickly perform on-target unit tests lowers their barrier to entry, and hence makes ISO26262 ASIL certification easier to obtain and allows faster production of ASIL rated software.

FIG. 19 shows exemplary code for a Second Unit that is used to test a Fist Unit. The code for the second unit may include code for a function Function 2 which is a real function that may produce variable outputs.

FIG. 20 shows exemplary code for a First Unit that is used that is being tested. As can be seen, a function unit32_t_to_test one includes a function call to Function 2 at line 111 of code. As mentioned above, it may be advantageous to replace the real Function 2 function with a stubbed out or fake function that returns values set by the programmer (e.g., to iterate through all possible outputs).

FIG. 21 shows an exemplary result produced by the MICP that stitches an image for code of FIG. 19 and an image for code of FIG. 20 within a single mega-image 2101. Notably, the mega-image 2101 includes a jump table that enables function Function 1 (at line 105) in sub-image one 2102 to call real function Function 2 at line 246 in addition to calling the fake function at line 193. The line numbers for function Function 2 may have been changed by MICP to avoid memory conflicts. One skilled in the art will note that while FIGS. 19-21 show C language code, any other programming language may have been used (e.g., assembly language specific to hardware being tested).

The system and method described herein is not limited to the use of testing. The system may be used whenever function overloading is beneficial including for readability or to save memory space, among other uses.

Figure 21A:
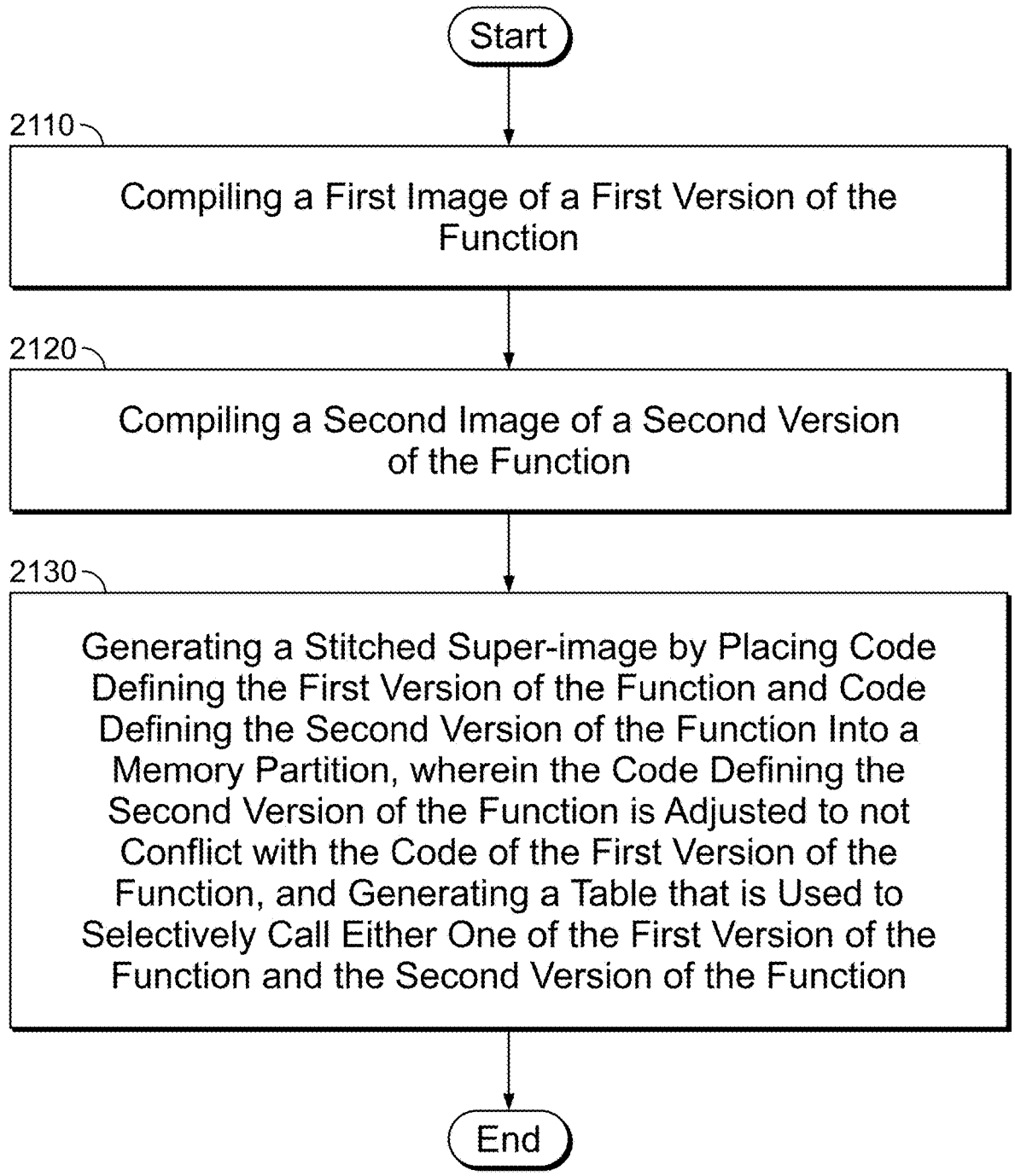
FIG. 21a shows a flow chart of illustrative steps for a method for overloading a function, in accordance with some embodiments of the present disclosure.

Some embodiments may include a method for overloading a function, as shown in FIG. 21*a*, the method comprising compiling a first image of a first version of the function 2110, compiling a second image of a second version of the function 2120, and generating a stitched super-image by placing code defining the first version of the function and code defining the second version of the function into a memory partition, wherein the code defining the second version of the function is adjusted to not conflict with the code of the first version of the function, and generating a table that is used to selectively call either one of the first version of the function and the second version of the function 2130. In some embodiments the first version of the function and the second version of the function are written in code that does not allow overloading functions. In some embodiments the first version of the function and the second version of the function are written in C code. In some embodiments the memory partition is location within a vehicle. In some embodiments the table defines a respective memory address for each of the first version of the function and the second version of the function. In some embodiments the first image of the first version of the function comprises first assembler code and the second image of the second version of the function comprises second assembler coder. Some embodiments further comprising calling each version of the function in the stitched super-image based on the table.

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following paragraphs.

What is claimed is:

1. A method for overloading a function, the method comprising:
    compiling a first image comprising first assembler code defining a first version of the function stored at a first memory address,
    compiling a second image comprising second assembler code defining a second version of the function stored at a second memory address, and
    generating a stitched super-image by:
        placing the first assembler code and the second assembler code into a memory partition, wherein the second assembler code is adjusted to not conflict with the first assembler code, and
        generating a table in the memory partition that is used to selectively call either one of the first version of the function and the second version of the function.

2. The method of claim 1, wherein the first version of the function and the second version of the function are written in code that does not allow overloading functions.

3. The method of claim 1, wherein the first version of the function and the second version of the function are written in C code.

4. The method of claim 1, wherein the memory partition is located within a vehicle.

5. The method of claim 1, wherein the table defines a respective memory address for each of the first version of the function and the second version of the function.

6. The method of claim 1, wherein the first assembler code represents a production version of the function stored at the first memory address, and the second assembler code represents a test version of the function stored at the second memory address different from the first memory address, such that the stitched super-image within the memory partition is configured to provide the production version of the function and the test version of the function.

7. The method of claim 1, further comprising calling each of the first version of the function and the second version of the function in the stitched super-image based on the table.

8. A system for overloading a function, the system comprising:
  memory comprising a memory partition,
  processing circuitry coupled to the memory configured to:
    compile a first image comprising first assembler code defining a first version of the function stored at a first memory address,
    compile a second image comprising second assembler code defining a second version of the function stored at a second memory address, and
    generate a stitched super-image by
      placing the first assembler code and the second assembler code into the memory partition, wherein the second assembler code is adjusted to not conflict with the first assembler code, and
      generating a table that is used to selectively call either one of the first version of the function and the second version of the function.

9. The system of claim 8, wherein the first version of the function and the second version of the function are written in code that does not allow overloading functions.

10. The system of claim 8, wherein the first version of the function and the second version of the function are written in C code.

11. The system of claim 8, wherein the memory partition is located within a vehicle.

12. The system of claim 8, wherein the table defines a respective memory address for each of the first version of the function and the second version of the function.

13. The system of claim 8, wherein the first assembler code represents a production version of the function stored at the first memory address, and the second assembler code represents a test version of the function stored at the second memory address different from the first memory address, such that the stitched super-image within the memory partition is configured to provide the production version of the function and the test version of the function.

14. The system of claim 8, wherein the processing circuitry is further configured to call each of the first version of the function and the second version of the function in the stitched super-image based on the table.

15. A non-transitory computer-readable medium for overloading a function having non-transitory computer-readable instructions encoded thereon that, when executed by a processor, causes the processor to:
  compile a first image comprising first assembler code defining a first version of the function stored at a first memory address,
  compile a second image comprising second assembler code defining a second version of the function stored at a second memory address, and
  generate a stitched super-image by
    placing the first assembler code and the second assembler code into a memory partition, wherein the second assembler code is adjusted to not conflict with the first assembler code, and
    generating a table that is used to selectively call either one of the first version of the function and the second version of the function.

16. The non-transitory computer-readable medium of claim 15, wherein the first version of the function and the second version of the function are written in code that does not allow overloading functions.

17. The non-transitory computer-readable medium of claim 15, wherein the first version of the function and the second version of the function are written in C code.

18. The non-transitory computer-readable medium of claim 15, wherein the memory partition is located within a vehicle.

19. The non-transitory computer-readable medium of claim 15, wherein the table defines a respective memory address for each of the first version of the function and the second version of the function.

20. The non-transitory computer-readable medium of claim 15, wherein the first assembler code represents a production version of the function stored at the first memory address, and the second assembler code represents a test version of the function stored at the second memory address different from the first memory address, such that the stitched super-image within the memory partition is configured to provide the production version of the function and the test version of the function.

* * * * *